United States Patent
Ke et al.

(10) Patent No.: US 8,248,476 B2
(45) Date of Patent: Aug. 21, 2012

(54) ROBUST STEREO CALIBRATION SYSTEM AND METHOD FOR ACCURATE DIGITAL IMAGE CORRELATION MEASUREMENTS

(75) Inventors: Xiodan Ke, Columbia, SC (US); Michael A. Sutton, Columbia, SC (US)

(73) Assignee: University of South Carolina, Columbia, SC (US)

( * ) Notice: Subject to any disclaimer, the term of this patent is extended or adjusted under 35 U.S.C. 154(b) by 516 days.

(21) Appl. No.: 12/553,561

(22) Filed: Sep. 3, 2009

(65) Prior Publication Data

US 2010/0079598 A1  Apr. 1, 2010

Related U.S. Application Data

(60) Provisional application No. 61/190,846, filed on Sep. 3, 2008.

(51) Int. Cl.
*H04N 17/00* (2006.01)

(52) U.S. Cl. .............................. 348/187; 348/180

(58) Field of Classification Search .................... 348/47, 348/48, 135, 136, 137, 139, 180, 184, 187; 702/85; 700/259, 254; H04N 13/02, 7/18, H04N 17/00, 17/02

See application file for complete search history.

(56) References Cited

U.S. PATENT DOCUMENTS

| | | | |
|---|---|---|---|
| 7,133,570 B1 | 11/2006 | Schreier et al. | |
| 2011/0310255 A1* | 12/2011 | Medeiros et al. | 348/187 |

OTHER PUBLICATIONS

Shreier et al., Advances in light microscope stereo vision, *Expl Mechanics*, 2004, vol. 44, pp. 278-288.

Sutton et al., Development of a Methodology for Non-Contacting Strain Measurements in Fluid Environments Using Computer Vision, *Optics and Lasers in Engineering*, 2000, vol. 32, pp. 367-377.

Sutton et al., Strain field measurements on mouse carotid arteries using microscopic three-dimensional digital image correlation, *J. Biomed. Mat. Res. Part A*, Jul. 2007, pp. 178-190, DOI:10.1002/jbm.a.31268.

Sutton et al., Advances in two-dimensional and three-dimensional computer vision, *Photomechanics*, Topics Appl. Phys., 2000, vol. 77, pp. 323-372.

\* cited by examiner

*Primary Examiner* — Sherrie Hsia
(74) *Attorney, Agent, or Firm* — Dority & Manning, P.A.

(57) ABSTRACT

A stereo calibration method is proposed to calibrate an interface's shape and position when the measurement system is in one media and measures deformation and strain of an object that is submerged in a different media. After the interface's shape and position are modeled by parameters, an explicit model of object points as measurement is established taking account of refraction happening at the interface. Efficiency and convergence are assured by using measurement of object points to acquire initial estimates for refraction angles at the interface. Then, an optimization method is performed to get the optimized value of interface parameters. Last, based on the resulting interface parameters, 3-dimensional positions of object points in all the subsequent measurement could be reconstructed accurately. Therefore, the distortion induced by refraction in the measurement is corrected. Numerical simulations of the proposed calibration process confirm that it is both robust and accurate for a range of experimental conditions, even in the presence of Gaussian noise in the measurement.

20 Claims, 8 Drawing Sheets

ROBUST STEREO CALIBRATION SYSTEM AND METHOD FOR ACCURATE DIGITAL IMAGE CORRELATION MEASUREMENTS

PRIORITY CLAIM AND CROSS-REFERENCE TO RELATED APPLICATION

This application claims the benefit of U.S. Provisional Patent Application No. 61/190,846 filed Sep. 3, 2008, entitled "ROBUST STEREO CALIBRATION METHOD FOR ACCURATE DIGITAL IMAGE CORRELATION MEASUREMENTS" and having the same inventors as present, which is incorporated herein by reference for all purposes.

GOVERNMENT SUPPORT CLAUSE

Certain aspects of the presently disclosed technology were developed with funding from the National Science Foundation through grant CMS-0556362. Therefore, the government may retain certain rights in this invention.

BACKGROUND OF THE INVENTION

The accurate measurements of full-field surface shape, displacements and strains for objects that are immersed in a media that is different from where the optical measurement system is provided, is of great interest in a variety of applications. For example, measuring deformation of biological materials over an extended period of time, such as vascular arteries, usually requires that the material be fully submerged in an adventitial bathing media with controlled temperature and pH. According to Snell's law, when light travels through different media, it refracts at the interface. Sutton et al. (Development of a Methodology for Non-Contacting Strain Measurements in Fluid Environments Using Computer Vision, Optics and Lasers in Engineering. (32) 2000; 367-377) calculated and measured the strain errors introduced by refraction when a camera in air measures a planar specimen submerged underwater. This work has clearly shown that strain errors increase rapidly as the angle between the optical axis and the interface changes. When the angle is 12°, the strain is as high as 1%.

Thus, there remains a need for an accurate and effective way to correct distortion induced by refraction and to calibrate measurement systems for multimedia applications.

SUMMARY OF THE INVENTION

According to its major aspects and briefly recited, the presently disclosed technology concerns a system and method for determining the shape and position of a multi-media interface and correcting the distortion introduced by refraction that happens at such interface(s). While the present technology applies especially well to optical measurement systems, it is not limited to optical measurement systems.

Certain aspects of the presently disclosed technology concern a system and method of calibrating a measurement system provided in a given media, while making several "readings" for calibration or, in the case of optical systems, images of a physical object in another media. The images are taken when the physical object undergoes in-plane translations, in-plane rotations and out-of-plane tilting with respect to the interface. From these images, the corresponding features on the object are extracted by image registration methods. Then, a mathematical algorithm is applied to these feature points to determine the shape and position of the interface. The resulting interface can then be used to reconstruct the three dimensional distortion-free locations of the object from its images when it is submerged in a media that is different from where the measurement system is and when it deforms. Therefore, the distortion caused by refraction at interfaces is corrected and the measurement system is able to quantify accurate motion and deformation for applications in multi-media.

An advantage of some embodiments of the invention is the preserved accuracy of measurement systems when they are applied to multi-media applications. This advantage allows users to set up measurement systems in their preferred media or environment and use them to measure what is happening in the other media without sacrificing any accuracy.

Another advantage of some embodiments of the invention is that the subject techniques are not based on or derived from a particular shape of interface(s) as long as the shape can be modeled using parametric representations. This permits the determination of interfaces that may be unusual in special applications, including multiply curved interfaces, singly curved interfaces and planar interfaces.

Still another advantage of some embodiments of the invention is that the present method is not based on or derived for applications with only two different media (i.e. one medium where the measurement system is and the other medium where the object is). Between these two media, there could be multiple media as long as these media have distinct interfaces that could be parameterized. This makes the present technology useful in varied applications.

Yet another feature of some embodiments of the present invention is that it allows measurement systems to be used to measure what is happening in the media where special-made measurement systems otherwise have to be employed, e.g., standard optical systems cannot work in an environment filled with erosive chemicals or with high temperatures. Once the harmful environment is restricted by a transparent material, the present method could be applied and make standard optical systems work without loss of accuracy in such a circumstance. This advantage extends regular measurement systems into broader application areas. Also, typically as measurement systems' specialty increases, the cost increases more rapidly. Here, the cost of a specialized measurement system may be obtained at a lower incremental cost.

In one exemplary embodiment of the present subject matter, a method for calibrating a measurement system is based on determination of interface parameters representative of an interface provided between the measurement system and a physical object to be measured. A first plurality of images of a calibration object are obtained, wherein the first plurality of images are obtained by a measurement system comprising two or more image capture devices that are provided in the same medium as the calibration object. A second plurality of images of the calibration object are obtained, wherein the second plurality of images obtained while the measurement system is in a different medium than the calibration object, the different media being separated from one another by the interface, and the second plurality of images obtained by the two of more image capture devices while the calibration object is provided at a respective plurality of different locations and orientations relative to said interface. Data corresponding to measured positions of selected image points from the first and second pluralities of images of the calibration object are extracted and electronically stored. Initial values of interface parameters from data corresponding to measured positions of selected image points from the first plurality of images are electronically calculated. Definitions of modeled positions of image points based on the initial values of the interface parameters are provided. An error function defined by the difference between modeled positions and measured positions of selected image points from the second plurality of images is defined and electronically stored.

In another exemplary embodiment of the present technology, a measurement system includes two or more image capture devices, a first memory, a second memory and a processor. The two or more image capture devices are configured to obtain a first plurality of images of a calibration object when provided in the same medium as the measurement system and a second plurality of images of the calibration object when provided in a different medium as the measurement system and separated by an interface. The first memory stores data corresponding to measured positions of selected image points from the first and second pluralities of images of the calibration object. The second memory stores software in the form of computer-executable instructions. The processor is coupled to the first and second memories and is configured to selectively implement the computer-executable instructions stored in the second memory to process the data stored in the first memory. The processor implements the computer-executable instructions stored in said second memory in order to implement the functions of: calculating initial values of interface parameters from data corresponding to measured positions of selected image points from the first plurality of images; providing definitions of modeled positions of image points based on said initial values of the interface parameters; and establishing an error function defined by the difference between modeled positions and measured positions of selected image points from the second plurality of images.

In a still further exemplary embodiment of the present technology, a method of processing an image taken of a physical object provided in a different physical medium than a measurement system to correct for refraction at an interface between the different media. In accordance with such method, at least one image of a physical object is obtained by a measurement system comprising two or more image capture devices that are provided in a different physical medium than the measurement system and separated therefrom by an interface. Measured image data points associated with the at least one image are stored in an electronic database. The measured image data points are electronically processed to determine actual image data points by applying a determined interface filter function to the measured image data points. Ultimately, the actual image data points are provided as visual output to a user.

Additional aspects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, including the Detailed Description of Preferred Embodiments accompanied by the following drawings.

DETAILED DESCRIPTION OF PREFERRED EMBODIMENTS

It is to be understood by one of ordinary skill in the art that the present discussion is a description of preferred embodiments only, and is not intended as limiting the broader aspects of the present invention. Aspects of the present invention may be described herein in connection with a stereo optical measurement system, partly for convenience and partly because the present invention works well with optical measurement systems, but the present invention is not limited to optical measurement systems. Any measurement system that has distortions caused by refraction can benefit from the present method.

Figure 1:
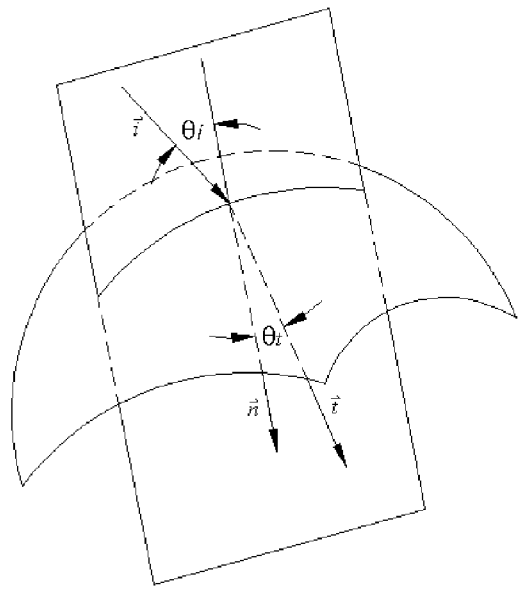
FIG. 1 is schematic representation defining incident and refracted rays and angles and illustrating how light refracts at the interface between two different media.

According to Snell's law, when light travels through two different media, it refracts at the interface in such a way that the incident and refracted rays meet two conditions. Defining the incident ray, $\bar{i}$, the refracted ray, $\bar{t}$ and the interface normal, $\bar{n}$, at the point of intersection (see FIG. 1), the first condition requires that all three vectors must lie in the same plane. This can be written mathematically in the form $$(\bar{i} \times \bar{n}) \cdot \bar{t} = 0 \tag{1}$$

where "×" denotes a cross-product and "·" denotes a scalar product. The second condition relates the angle of refraction to the angle of incidence. Defining the incident angle $\theta_i$, the refracted angle $\theta_r$, the indices of refraction for two media as $\eta_i$ and $\eta_r$, the equation is written $$\eta_i \sin \theta_i = \eta_r \sin \theta_r. \tag{2}$$

The refractive index $\eta$ for air is 1.0 and for water is 1.33.

Figure 2:
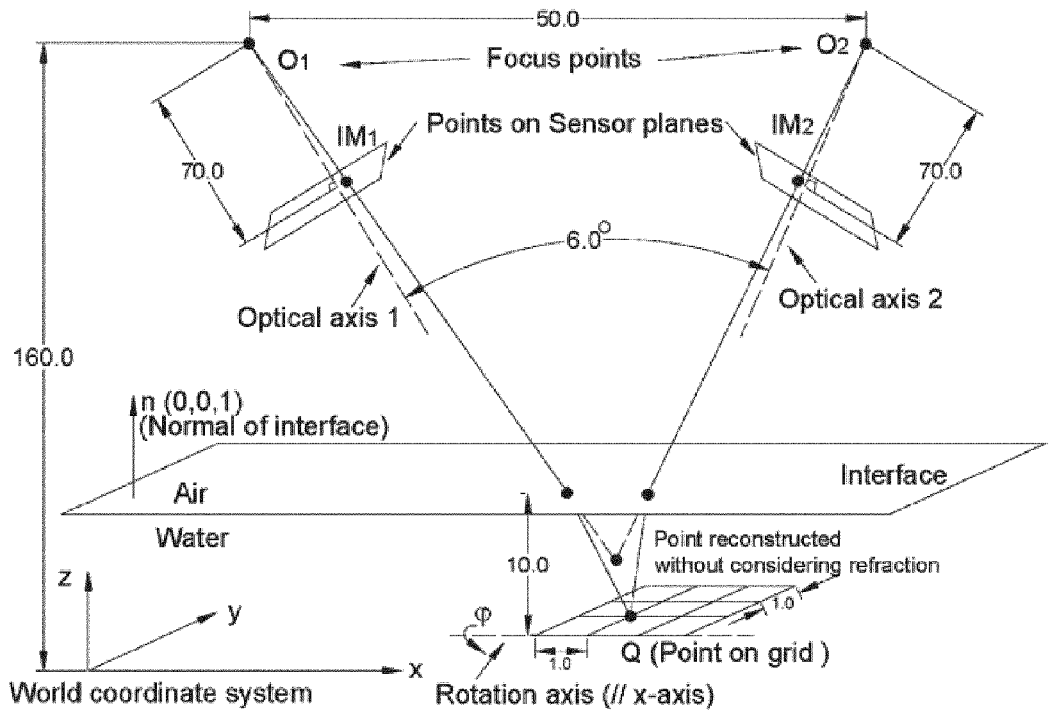
FIG. 2 is a schematic representation of a stereo camera system demonstrating the source of pseudo strains caused by refraction.

In order to demonstrate how spatial distortions, i.e. pseudo strains, are introduced by refraction, numerical simulations have been conducted in a manner that reflects the imaging process for a typical stereo vision system viewing a submerged object, such as represented schematically in FIG. 2. To perform the simulation, it is assumed that the following parameters are known a priori: (a) all intrinsic and extrinsic camera parameters for both cameras; (b) indices of refraction for all media; (c) interface orientation and location; and (d) orientation and position of a calibration object (e.g., a calibration target with nine grid points).

Figure 3:
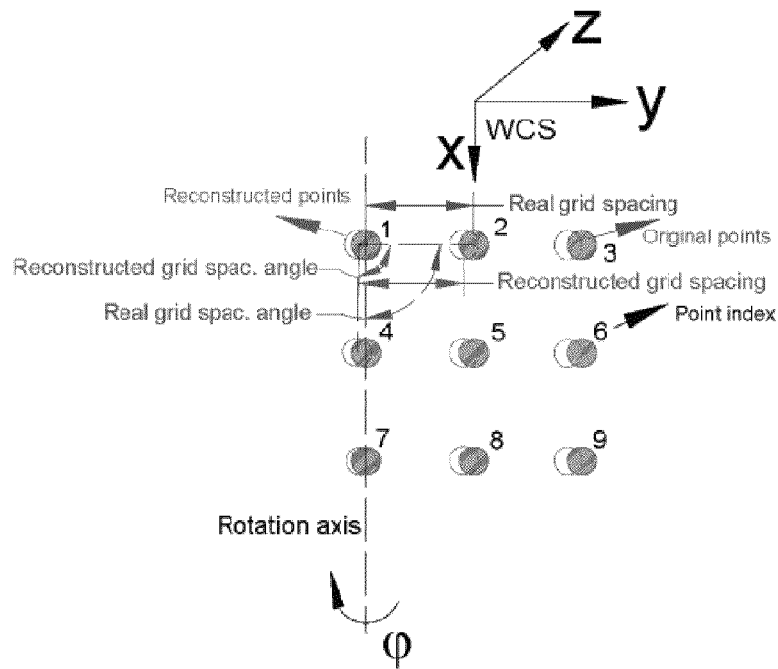
FIG. 3 is a graph showing real and reconstructed grid spacing and corresponding angles for normal and shear strains in grid spacing.

The simulation procedure is as follows. First, the center of each of nine grid points on a planar grid submerged in water at a pre-specified distance from an air-water interface is imaged onto the sensor plane of both stereo cameras while considering refraction. Second, the matching locations on both sensor planes for each grid point are projected to obtain a three-dimensional spatial position without considering refraction. Finally, by comparing the actual grid shape with the 'unrefracted' reconstruction, the normal strains and the shear strains in the grid spacing are obtained. The normal strain is defined for each pair of grid points using the definition of average engineering normal strain, the initial grid spacing, and the reconstructed three-dimensional grid point locations to define the final grid spacing. Similarly, shear strain is defined for each pair of orthogonal grid lines using the initial angle ($\pi/2$) and the final angle obtained using the reconstructed three-dimensional grid point locations for all three grid points. FIG. 3 shows the real, reconstructed grid spacing and the corresponding angles.

The process noted above was performed for a range of grid rotation angles, $\phi$, relative to the interface. Here, the angle ($\phi=0°$) corresponds to the grid being placed parallel to the planar interface. Table 1 shows the pseudo normal strains and the pseudo shear strains of grid spacing as a function of the angle, $\phi$. As shown in Table 1, when $\phi \geq 5°$, the largest pseudo normal strain $\epsilon_{nn} > 500 \times 10^{-6}$, errors that should be minimized when attempting to develop advanced measurement methods with high accuracy.

TABLE 1

Pseudo strains with varied angle $\phi$ between grid and interface

| | Normal strain ($\times 10^{-6}$ or μs) | | Shear strain ($\times 10^{-6}$ or μs) | |
|---|---|---|---|---|
| $\phi$ (°) | Mean | Standard deviation | Mean | Standard deviation |
| 0 | 257 | 269 | 13 | 47 |
| 5 | −583 | 609 | 67 | 278 |
| 10 | −3083 | 3220 | 123 | 564 |
| 20 | −12823 | 13393 | 232 | 1121 |
| 30 | −28133 | 29384 | 359 | 1692 |
| 40 | −58340 | 60934 | 537 | 2495 |

The subject stereo calibration methodology determines the orientation and position of the interface, as well as all stereo system camera parameters, during a two-stage calibration process. Such techniques are based on bundle adjustment and an image-based optimization metric implemented using Levenburg-Marquardt (LM) non-linear algorithm.

The present techniques utilize a method of modeling the interface with a plurality of parameters. In one exemplary embodiment, the interface is modeled as a plane defined by parameters a, b and d as $$ax + by + (\sqrt{1-a^2-b^2})z + d = 0, \tag{3}$$

where x, y, and z are coordinates in a coordinate system and a, b and d are interface parameters. In yet another embodiment, the present method is not limited to planar interfaces and the interface could be of any shape as long as it could be modeled using a parametric representation.

The present method allows multiple interfaces in the optical path from the measurement system to the object. For example, in order to make sure that the interface is constant during calibration and measurement process, a piece of transparent material (as medium G) having thickness, TH, is added between medium A where the measurement system is and medium W where the object is. This additional, parallel planar interface is included in the development since many practical applications will require viewing through a transparent containment vessel. In such a configuration, there would be two interfaces: the interface A/G between medium A and medium G and the interface G/W between medium G and medium W. In such configuration, the two interfaces have the same orientation. The interface A/G is:

$$ax + by + \sqrt{1-a^2-b^2}z + d - TH\sqrt{1-a^2-b^2} = 0, \tag{4a}$$

and the interface G/W is:

$$ax + by + \sqrt{1-a^2-b^2}z + d = 0. \tag{4b}$$

The normal $\bar{n}$ of both interfaces is:

$$\bar{n} = (a, b, \sqrt{1-a^2-b^2}). \tag{4c}$$

After the interface parameters are determined, the accurate 3-D positions of immersed objects from images could be reconstructed by taking account of interfaces like this: (1) Project rays according to the measurement system and the image points of the object. For example, if the measurement system is modeled as a pinhole, the projective ray is from the focal point to points in the sensor plane. The present model is not limited to pinhole-modeled measurement systems, and it can apply to any measurement systems as long as the 3-D location of the object could be reconstructed from its measurement; (2) When the rays hit the interfaces, they refract according to the resulting shape and position of the interface; (3) Pairs of corresponding rays are triangulated and the true 3-D positions of the object points are obtained. After this, the refraction distortion caused by light traveling through media A, media G and media W can be corrected simultaneously.

In one exemplary embodiment, the measurement system is a stereo optical system with two cameras that are modeled as pinhole devices. As noted before, the current invention does not restrict its application to optical systems, and the current invention is valid in any other measurement systems capable of acquiring images through refractive media. In one exemplary embodiment, the method uses a planar grid of known spacing as the calibration object. In another embodiment, calibration can be performed with calibration objects such as cubes, rectilinear parallelepipeds. In yet another embodiment, a calibration object with identifiable features can be translated or rotated by known amounts.

A schematic of a typical setup of a stereo optical system is shown in FIG. 2. The world coordinate system (WCS) with axes $(X_w, Y_w, Z_w)$ is coincident with camera 1's local coordinate system, which is not necessary. Each camera's local coordinate system (camCS) is defined by a rotation matrix $[R]$ and a translation vector $\{T\}$ to the WCS. Any point $p(x_{cam}, y_{cam}, z_{cam})$ defined in a local coordinate system could be transformed to point $P(x_w, y_w, z_w)$ in WCS using the following form $$\begin{bmatrix} x_{cam} \\ y_{cam} \\ z_{cam} \end{bmatrix} = [R] \begin{bmatrix} x_w \\ y_w \\ z_w \end{bmatrix} + \{T\} \tag{5}$$

For camera 1, $[R]$ is the identity matrix and $\{T\}$ is a zero vector. For camera 2, $[R]$ is the rotation matrix and $\{T\}$ is the translation vector from camCS2 to WCS. $[R]$ and $\{T\}$ for both cameras are called extrinsic parameters of the stereo optical system. Similarly, the calibration grid's local coordinate system, GCS, has axes $X_g, Y_g$ and $Z_g$, with $Z_g$ perpendicular to the grid. Any point $p(x_g, y_g, 0)$ on the grid is transformed to the WCS using equation (6a)

$$\begin{bmatrix} x_w \\ y_w \\ z_w \end{bmatrix} = [R_g] \begin{bmatrix} x_g \\ y_g \\ 0 \end{bmatrix} + \begin{bmatrix} D_x \\ D_y \\ D_z \end{bmatrix} \tag{6a}$$

where $[D]$ is the translation vector between the WCS and the GCS defined in the WCS, and the rotation matrix can be defined in terms of Eular angles $\gamma_x, \gamma_y,$ and $\gamma_z$ as $$[R_g] = \begin{bmatrix} \cos\gamma_y & 0 & \sin\gamma_y \\ 0 & 1 & 0 \\ -\sin\gamma_y & 0 & \cos\gamma_y \end{bmatrix} \cdot \tag{6b}$$

$$\begin{bmatrix} 1 & 0 & 0 \\ 0 & \cos\gamma_x & -\sin\gamma_x \\ 0 & \sin\gamma_x & \cos\gamma_x \end{bmatrix} \begin{bmatrix} \cos\gamma_z & -\sin\gamma_z & 0 \\ \sin\gamma_z & \cos\gamma_z & 0 \\ 0 & 0 & 1 \end{bmatrix}.$$

For the remaining description of the invention, $\gamma_x, \gamma_y, \gamma_z, D_x, D_y$ and $D_z$ are called the grid's parameters.

A point $p(x_{cam}, y_{cam}, z_{cam})$ on the grid is projected to point $P_{sen}(Xs, Ys)$ on the sensor plane by $$\begin{bmatrix} X_s \\ Y_s \\ 1 \end{bmatrix} = [M_p] \begin{bmatrix} x_{cam}/z_{cam} \\ y_{cam}/z_{cam} \\ 1 \end{bmatrix} \tag{7a}$$

where $[M_p]$ is the camera's projection matrix which is a combination of the camera's intrinsic and extrinsic parameters as $$[M_p] = \begin{bmatrix} f_x & \text{skew} & C_x \\ 0 & f_y & C_y \\ 0 & 0 & 1 \end{bmatrix} \text{ and } \begin{array}{l} f_x = fS_x \\ f_y = fS_y \end{array}. \tag{7b}$$

In equation (7b), the projection matrix $[M_p]$ is composed of $f_x, f_y, C_x, C_y,$ and skew. The lens focal length is $f$ and the scale factors are $S_x$ and $S_y$. The center in the sensor plane is $(C_x, C_y)$ and skew is the skew factor.

To account for lens distortion, the relationship between the distorted sensor location $(X_s^d, Y_s^d)$ and the undistorted sensor location $(X_s, Y_s)$ can be modeled by using a lens distortion factor $\kappa$ $$X_s^d = \frac{X_s}{1 + \kappa\sqrt{(X_s)^2 + (Y_s)^2}}; Y_s^d = \frac{Y_s}{1 + \kappa\sqrt{(X_s)^2 + (Y_s)^2}} \tag{7c}$$

and an approximate inverse of equation (7c) can be written as $$X_s = \frac{2X_s^d}{1 + \sqrt{1 - 4\kappa[(X_s^d)^2 + (Y_s^d)^2]}}; \tag{7d}$$

$$Y_s = \frac{2Y_s^d}{1 + \sqrt{1 - 4\kappa[(X_s^d)^2 + (Y_s^d)^2]}}.$$

Lens distortion could also be corrected by using other prior lens distortion removal methods before calibration, for example as disclosed in Shreier et al., Advances in light microscope stereo vision, *Expl Mechanics*, 2004, 44, 278-288 or Sutton et al., Strain field measurements on mouse carotid arteries using microscopic three-dimensional digital image correlation, *J. Biomed. Mat. Res. Part A*, July 2007, 178-190, DOI:10.1002/jbm.a.31268, both of which are incorporated herein by reference for all purposes. In this way, all the calibration processes will be implemented on images that are free of lens distortion.

Equations (6a), (6b), and (7a) demonstrate that any grid location defined in GCS by $(m\Delta x, n\Delta y, 0)$, where m and n are non-negative integers as grid indices, is transformed into the sensor plane. The parameters involved in the transformation include: (a) six unknown extrinsic parameters $(\gamma_x, \gamma_y, \gamma_z, D_x, D_y, D_z)$ for the grid; (b) a rotation matrix $[R]$ and a translation vector $\{T\}$ as the camera's extrinsic parameters; and (c) five of the camera's intrinsic parameters $(f, S_x, S_y, \text{skew}, \kappa)$.

Suppose $I_M^{mo\_air}(X_s^{mo\_air}, Y_s^{mo\_air})$ or $I_M^{mmo\_air}(X_s, Y_s)$ represents an image point on the sensor plane when the calibration grid is in air without refraction. The quantity $I_M^{mo\_air}(X_s, Y_s)$ is obtained by (a) transforming points in the GCS to the WCS using equation (6), transforming points in the WCS to the camCS using equation (5), and (c) transforming points in the camCS into the sensor plane using equations (7a) and (7b). Therefore, $I^M_{mo}{}^{-air}(X_s, Y_s)$ is modeled in terms of the unknown parameters: stereo cameras intrinsic and extrinsic parameters and grid parameters, together with other given parameters, such as grid spacing and indices.

Figure 4:
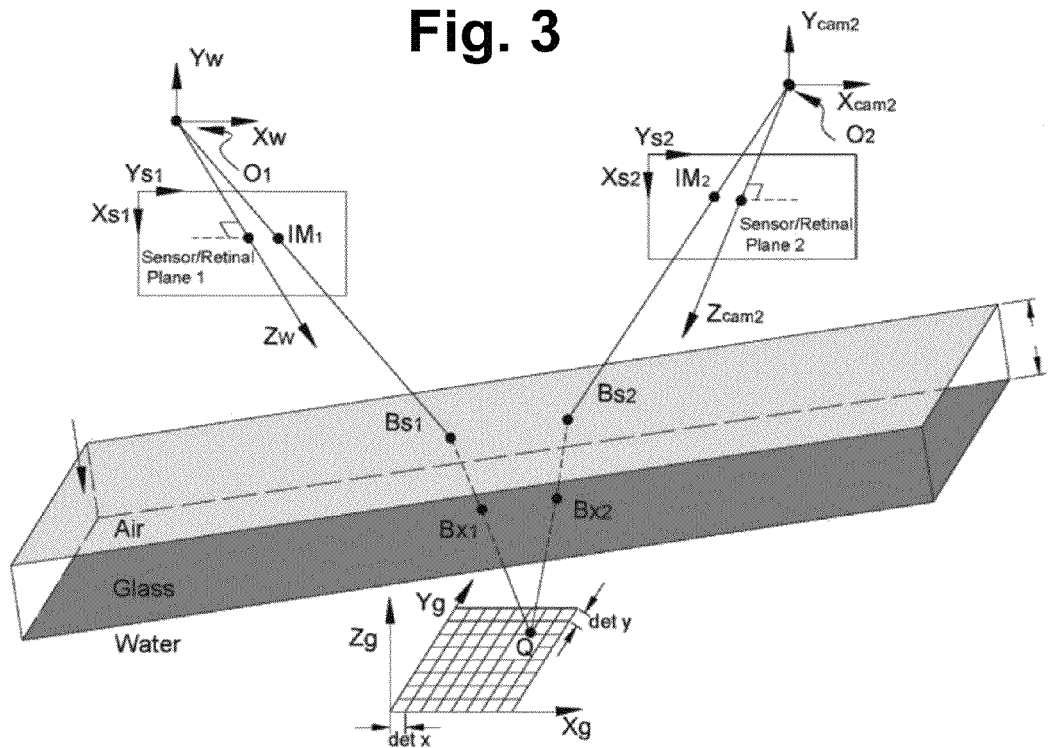
FIG. 4 is a schematic representation of a stereo camera system with an interface between different media, as would be present during an interface calibration process in accordance with the presently disclosed technology.

As shown in FIG. 4, an object point Q is imaged onto the sensor planes of both cameras 1 and 2 with coordinates of $I_{M1}$ and $I_{M2}$ in the WCS, respectively. FIG. 4 shows the light path followed by the principal ray, along with the refraction that occurs at each interface.

Figure 5:
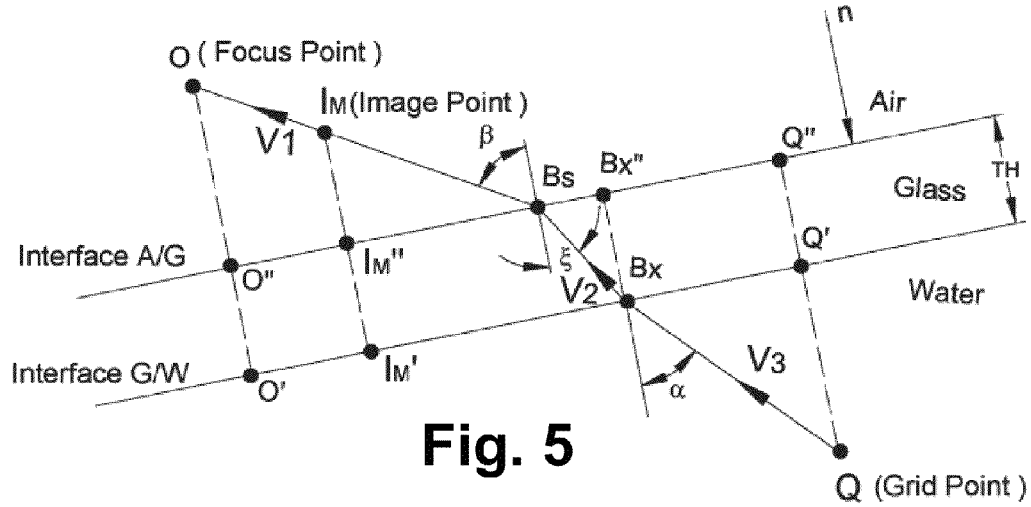
FIG. 5 is a graphical representation of a transmitted light path from a grid point (Q) in a first medium (W), through two parallel planar interfaces associated with a second medium (G) to a focus point (O) of a measurement system in a third medium (A)

FIG. 5 shows the light path from a grid point Q immersed in fluid to one of the stereo cameras, where all components of the principal ray are in a common plane and the sensor coordinates for $I_M$ have been transformed into the WCS using the inverse of equations (7) and (5). Light travelling from Q is refracted at points $B_X$ and $B_S$ where the ray intersects an optical interface. The refraction angles ($\alpha$, $\beta$, $\xi$) satisfy equation (2) in Snell's law, with $V_3(QB_x)$, $V_2(B_xB_s)$ and $V_1(I_MO)$ (representing vectors from Q to $B_x$, $B_x$ to $B_s$, and $I_M$ to O, respectively).

In order to understand properties of the light path, projection points have been introduced: (a) Q', O', and $I_M'$ are projections of Q, O, and $I_M$ onto the interface G/W; and (b) Q", O", $I_M$" and $B_X$" are projections of Q, O, $I_M$, and $B_x$ onto the interface A/G.

According to Snell's law, it is readily shown that (a) $I_M$, O, $B_s$, $B_x$, Q, and their projections onto both interfaces are all on the same plane; (b) O", $I_M$", $B_s$, $B_x$", and Q" are on the same straight line; and (c) O', $I_M'$, $B_x$, and Q' are on another straight line. As developed in the following section, the relationship between Q on the calibration grid and its corresponding image point on the sensor plane is divided into three steps: (a) determine $B_x$ as a function of Q; (b) obtain $B_s$ as a function of $B_x$; and (c) define image position $(X_s, Y_s)$ in terms of $B_s$.

Since the relationship between the refraction angles is nonlinear, expressions in terms of Q and n that may be solved iteratively using estimates for ($\alpha$, $\beta$, $\xi$) based on points measured on the sensor plane. The approach allows one to obtain numerical solutions without solving non-linear equations. The numerical simulations disclosed herein will show that the proposed optimization process converges well and the results are accurate and reliable, even in the presence of Gaussian random intensity noise.

Establishment of a relationship between Q on the calibration grid and $I_M(X_s, Y_s)$ on the sensor plane can be divided into three steps: (a) Model of $B_x$ in terms of Q; (b) Model of $B_s$ in terms of $B_x$; (c) Model of $I_M^{model}(X_s^{model}, Y_s^{model})$ in terms of $B_s$. (Modeled parameters may be referred to herein as "model" or "mo" for short.) Since $\alpha$, $\beta$, $\xi$ are nonlinearly related according to Eq. (2), it is impossible to determine $B_x$, $B_s$ or $I_M^{model}(X_s^{model}, Y_s^{model})$ in terms of Q and $\bar{n}$ directly due to no explicit analytical solutions for nonlinear equations. In the present invention, $\alpha$, $\beta$, $\xi$ are parameters to be estimated by points measured on the sensor plane. A unique aspect of this invention is that this approach eliminates the need to solve nonlinear equations, as evidenced by simulations that show the optimization process converges well and the results are accurate and reliable.

Suppose $I_M^{measured}(X_s^{measured}, Y_s^{measured})$ is the point measured on the sensor plane and it has been transformed to $I_M^{measured}(x_w, y_w, z_w)$ in WCS by Eq. (3) and Eq. (4). (Measured parameters may be referred to herein as "measured" or "me" for short.) Then the refraction angle $\alpha$, $\beta$, $\xi$ could be expressed as, $$\beta = a\cos\left(\frac{(OI_M^{measured})\cdot\bar{n}}{\|OI_M^{measured}\|}\right) \quad (8a)$$

$$\alpha = a\sin\left(\frac{\eta_A}{\eta_W}\sin\beta\right) \quad (8b)$$

$$\xi = a\sin\left(\frac{\eta_A}{\eta_G}\sin\beta\right) \quad (8c)$$

where $\eta_A$, $\eta_G$ and $\eta_W$ are indexes of refraction of medium A, medium G and medium W. $\|\ \|$ is $L^2$ matrix norm over magnitude for a vector.

To obtain the relationship between $B_x(x_{Bx}, y_{Bx}, z_{Bx})$ and Q, it is helpful to first note that $B_x$ is on the G/W interface. As shown in FIGS. 4 and 5, this gives rise to the following:

$$ax_{Bx}+by_{Bx}+\sqrt{1-a^2-b^2}z_{Bx}+d=0 \quad (9a)$$

$\nabla_1^{measured}$, $\nabla_3^{model}$ and $\bar{n}$ are on the same plane, such that:

$$[(I_M^{measured}O)\times(QB_x)]\cdot\bar{n}=0 \quad (9b)$$

The refraction angle relation is:

$$\|Q"B_x\|^2 = [\tan(\alpha)^*\|Q'Q\|]^2 \quad (9c)$$

As Q', O' could be substituted using Q, O, $\bar{n}$, the analytical model of $B_x$ can be obtained in terms of O, $I_M^{me}$, Q, $\bar{n}$ by simultaneously solving equations (9a), (9b) and (9c). From Eq. (9c), there would be two possible solutions of $B_x$ with the same absolute value but opposite sign in $B_x$'s x or y coordinate. Since O', $B_x$ and Q' are on the same straight line, and three points have to be in order with $B_x$ in the middle, three components of the vector Q'$B_x$ have the same sign as those of Q'O', respectively which serves as a convenience condition to determine the correct sign for $B_x$.

In determining a model for $B_s$, it is helpful to note that $B_s$ satisfies the following three conditions:
(a) $B_s$ is on the interface A/G such that $$ax_{Bs}+by_{Bs}+\sqrt{1-a^2-b^2}z_{Bs}+d+TH\sqrt{1-a^2-b^2}=0 \quad (10a)$$

(b) $\nabla_1^{measured}$, $\nabla_2^{model}$ and $\bar{n}$ are on the same plane such that $$[(OI_M^{measured})\times(B_xB_s)]\cdot\bar{n}=0 \quad (10b)$$

(3) the refraction angle relation is:

$$\|B_x"B_s\|^2 = [\tan(\xi)^*TH]^2 \quad (10c)$$

As Q", O", $B_x$" could be substituted using Q, O, $\bar{n}$, TH, the analytical model of $B_s$ can be obtained in terms of O, $I_M^{me}$, Q, $\bar{n}$, TH by solving equations (10a), (10b) and (10c) simultaneously. As O", $B_s$, and Q" are on the same straight line, and three points have to be in order with $B_s$ in the middle, three components of the vector Q"$B_s$ have the same sign as those of the vector Q"O", respectively, which can also be used as a condition for the program to pick up the correct sign for $B_s$.

In determining a model of $I_M^{model}(X_s^{model}, Y_s^{model})$, suppose $I_M^{model}(x_w, y_w, z_w)$ is the modeled image point of Q in camCS. $B_s$ obtained from the previous steps is transformed to $I_M^{model}(X_s^{model}, Y_s^{model})$ or $I_M^{model}(X_s, Y_s)$ by Eq. (7c). Therefore $I_M^{model}(X_s^{model}, Y_s^{model})$ is modeled in terms of the unknown interface parameters, grid parameters, and stereo cameras' intrinsic and extrinsic parameters, together with measurements on the sensor plane $I_m^{me}(X_s^{me}, Y_s^{me})$ and other given parameters, such as refractive indices, vessel wall thickness, grid spacing and indices.

The present method uses an optimization method to obtain the optimal parameters of interfaces. The method does not restrict itself to a particular optimization method and the optimization method could be any kind In one exemplary embodiment, the present method employs the least square optimization method and bundle adjustment. Suppose $\chi^2$ is the error function on two sensor planes and it is defined by the difference between $I_M^{mo}(X_s^{mo}, Y_s^{mo})$ and $I_M^{me}(X_s^{me}, Y_s^{me})$ as follows:

$$\chi^2 = \sum_{k=1}^{2} \sum_{i=1}^{NView} \sum_{j=1}^{MPNTS} \left[ (X_{s\ i,j,k}^{mo} - X_{s\ i,j,k}^{me})^2 + (Y_{s\ i,j,k}^{mo} - Y_{s\ i,j,k}^{me})^2 \right] \quad (11)$$

where the summation is among all the points on the calibration grid, all the views of the grid and two sensor planes from two cameras. The unknown parameters that need to be optimized are the interface parameters a, b, d, the grid parameters for each view, and the stereo's intrinsic and extrinsic parameters. The calibration problem is not reduced to minimization of $\chi^2$.

Considering the uniqueness and convergence problems of any non-linear optimization process, this work proposes a calibration methodology that separates the process into two successive general parts: (a) stereo system calibration to obtain stereo cameras' intrinsic and extrinsic parameters, and (b) interface calibration to obtain interface parameters that determine orientation and position of each planar interface. The stereo calibration system uses a first plurality of images when the calibration grid is in air and uses $I_M^{mo-air}(X_s, Y_s)$ as its image point model on sensor planes. The interface calibration uses a second plurality of images when the calibration grid is submerged in fluid and in its $I_M^{mo}(X_s, Y_s)$, the stereo cameras' intrinsic and extrinsic parameters are taken as given. The interface parameters a, b, and d are to be determined using a method of bundle optimization such as defined in equation (11). Additional details regarding more particular exemplary steps of the calibration process are now provided and are discussed with reference to FIG. 6.

Figure 6:
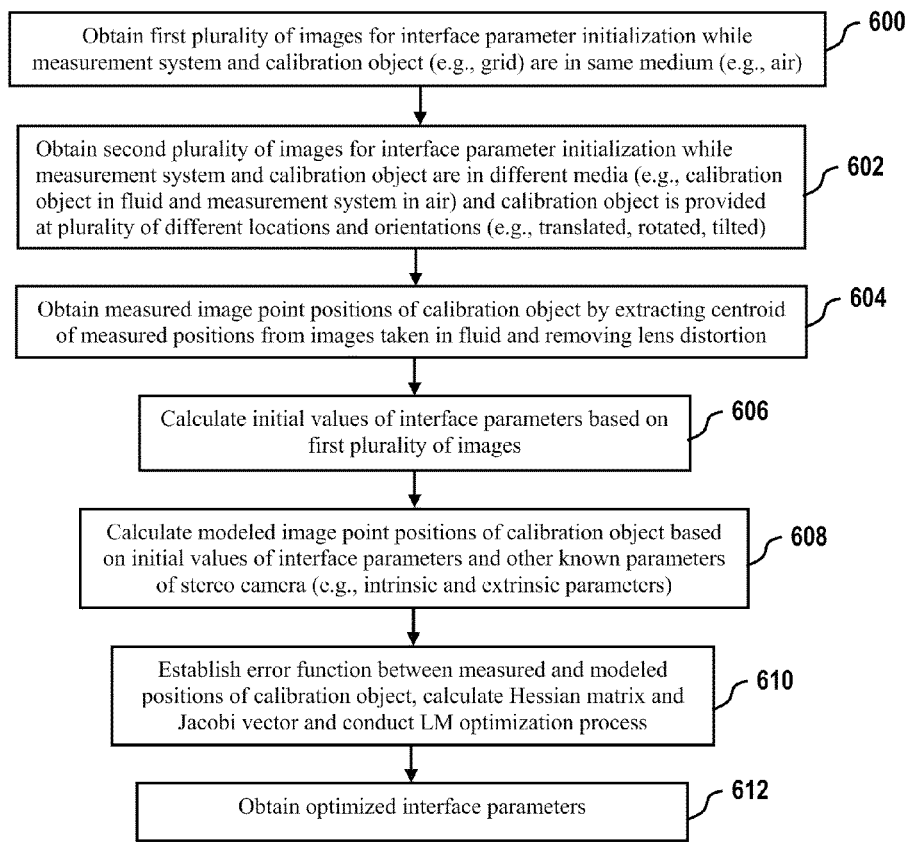
FIG. 6 is a flow chart of exemplary method steps in a process for calibrating a measurement system in accordance with aspects of the presently disclosed technology.

Referring now to FIG. 6, step 600 involves obtaining a first plurality of images for interface parameter initialization while cameras in a measurement system and a calibration object (e.g., grid) are in the same medium (e.g., Air-A). Initial values of the interface parameters are then calculated in step 606 based on this first plurality of images. For example, in one embodiment, the system's intrinsic and extrinsic parameters R, T and $M_p$ are determined in the single media A by any standard calibration procedures. The interface thickness TH and the grid spacing $\Delta x$ & $\Delta y$ are measured. They are all known when calibrating the interface parameters. The present invention does not restrict itself to this procedure. All the unknown parameters could be optimized at a single time or step by step as preferred. Additional details of the first step (a) in the subject calibration may be implemented in accordance with the calibration process disclosed in U.S. Pat. No. 7,133,570 (Schreier et al.), which is hereby incorporated by reference herein for all purposes.

In accordance with a second step 602, two image capture devices (e.g., digital cameras) take high resolution images simultaneously of a common calibration object (e.g., a calibration grid) at varied locations and orientations relative to the interface. The grid may experience as much variation in orientation as possible including in-plane translations, in-plane rotations and out-of-plane tilting. The step of obtaining high resolution images is repeated several times and a series of image pairs corresponding to a second plurality of images are acquired.

Exemplary step 604 involves extracting measured image point positions $I_M^{measured}(X_s^{measured}, Y_s^{measured})$ on the sensor plane. Additional processing of such extracted measured image point positions, as indicated in step 606 involves transforming the measured image point positions (in pixels) to the world coordinate system (in mm) by Eq. (5) and Eq. (7), thus calculating initial values of interface parameters based on the the first plurality of images (e.g., the images obtained when the measurement system and the calibration object are in the same medium). Step 606 may also involve removing lens distortion. In step 608, the image point position $I_M^{model}(X_s^{model}, Y_s^{model})$ for all of the known grid positions is predicted using a combination of Eq. (8), (9) and (10) and transformed to sensor planes as $I_M^{mo}(X_s, Y_s)$ by equation (7a). In step 610, the error function $\chi^2$ is established by Eq. (11). The error function may be minimized to obtain the optimal values of a, b and d (the interface parameters) together with grid parameters $D_x^i, D_y^i, D_z^i, \gamma_x^i, \gamma_y^i, \gamma_z^i$ for each view i. The results of the optimization are used to obtain optimized interface parameters, as indicated in step 612.

A modified LM non-linear optimization algorithm may be employed to determine the interface parameters a, b and d together with the grid parameters for all views. LM is an iterative procedure that is used widely to solve non-linear least-square problems and has become a standard technique used extensively in many computer vision problems. Letting $\omega$ be a vector composed of all the unknowns to optimized, $\omega = [D_x^1, D_y^1, D_z^1, \gamma_x^1, \gamma_y^1, \gamma_z^1, \ldots, D_x^i, D_y^i, D_z^i, \gamma_x^i, \gamma_y^i, \gamma_z^i, \ldots, a, b, d]^T$. H is the Hessian matrix and $$H(i, j) = \left. \frac{\partial^2 \chi^2}{\partial \varpi_i \partial \varpi_j} \right|_{\varpi}.$$

J is the gradient of $\chi^2$ and $$J(i) = \left. \frac{\partial^2 \chi^2}{\partial \varpi_i} \right|_{\varpi}.$$

To ensure that the non-linear optimization process converges to the global minimum for $\chi^2$, reasonable initial values for $\omega$ may be determined. For example, the interface parameters a, b and d can be roughly estimated by taking images of the calibration grid or a speckled planar specimen located near the interface and approximately parallel to the interface. Based on the calibrated values for the stereo camera's intrinsic and extrinsic parameters, the calibration grid or the planar specimen's spectral position can be reconstructed and used to estimate the interface parameters. The grid's parameters are estimated based on the rough estimation of the interface parameters by taking refraction into consideration.

It should be appreciated that the calibration method discussed above can be implemented by a measurement system including a special-purpose computer control system for implementing the subject calibration features and steps. An example of such a measurement system 500 is shown in schematic form in FIG. 15. More particularly, the exemplary measurement system 500 includes two or more image capture devices (shown in FIG. 15 as first and second cameras 502 and 504). Computer control system 512 may generally include such components as at least one memory/media element or database for storing data and software instructions as well as at least one processor. In the particular example of FIG. 15, a processor(s) 522 and associated memory/media elements 524a, 524b and 524c are configured to perform a variety of computer-implemented functions (i.e., software-based data services). At least one memory/media element (e.g., element 524b in FIG. 15) is dedicated to electronically storing software and/or firmware in the form of computer-readable and executable instructions that will be implemented by the one or more processor(s) 522. Other memory/media elements (e.g., memory/media elements 524a, 524c) are used to store data which will also be accessible by the processor(s) 522 and which will be acted on per the software instructions stored in memory/media element 524b. The various memory/media elements of FIG. 15 may be provided as a single or multiple portions of one or more varieties of computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others.

Figure 15:
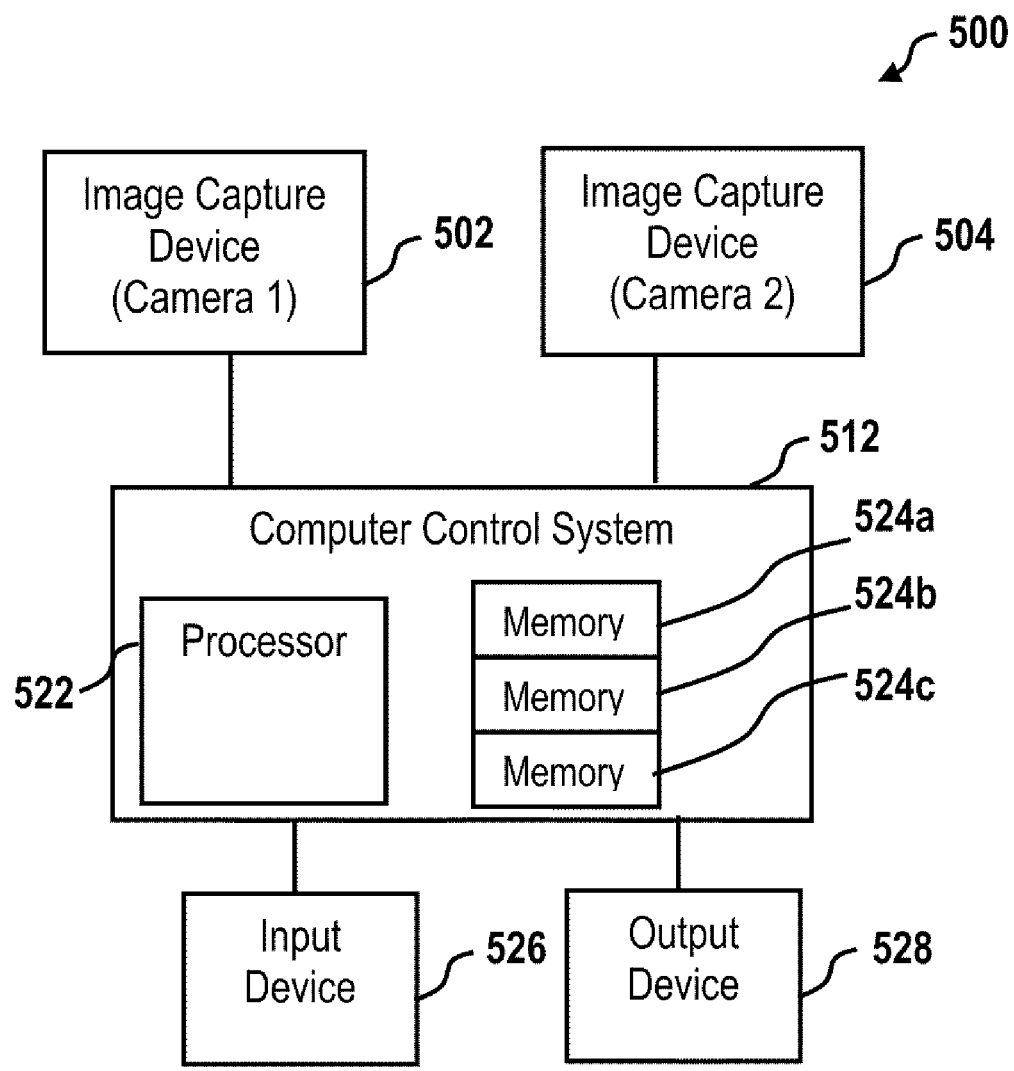
FIG. 15 is a schematic representation of exemplary hardware components for implementing aspects of the subject calibration technology.

Although FIG. 15 shows three separate memory/media elements 524a, 524b and 524c, the content dedicated to such devices may actually be stored in one memory/media element or in multiple elements, any such possible variations and other variations of data storage will be appreciated by one of ordinary skill in the art.

In one particular embodiment of the present subject matter, a first portion of memory/media 524a is configured to store input data for the subject calibration system and related methods. Input data stored in memory/media element 524a may include captured images, including the first and second pluralities of images captured when the measurement system and a calibration object are in the same media or in different media, extracted data associated with image points defining the images, known parameters such as refraction indices, calibration object parameters, interface parameters and the like. Some of such input data may be captured by the cameras 502 and 504, or may be alternatively or additionally be pre-programmed into memory/media element 524a. Still further, such information may also be entered as input data from a user accessing an input device 526, which may correspond to one or more peripheral devices configured to operate as a user interface with computer control system 512. Exemplary input devices may include but are not limited to a keyboard, touch-screen monitor, microphone, mouse and the like.

Second memory element 524b includes computer-executable software instructions that can be read and executed by processor(s) 522 to act on the data stored in memory/media element 524a to create new output data (e.g., processed image data, calibration constants, interface parameters, new error functions, reconstructed image points, etc.) for storage in a third memory/media element 524c. Such output data may be provided to a peripheral output device 528, such as monitor, printer or other device for visually depicting the output data, or as control signals to still further components. Computing/processing device(s) 522 may be adapted to operate as a special-purpose machine by executing the software instructions rendered in a computer-readable form stored in memory/media element 524b. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

Figure 7:
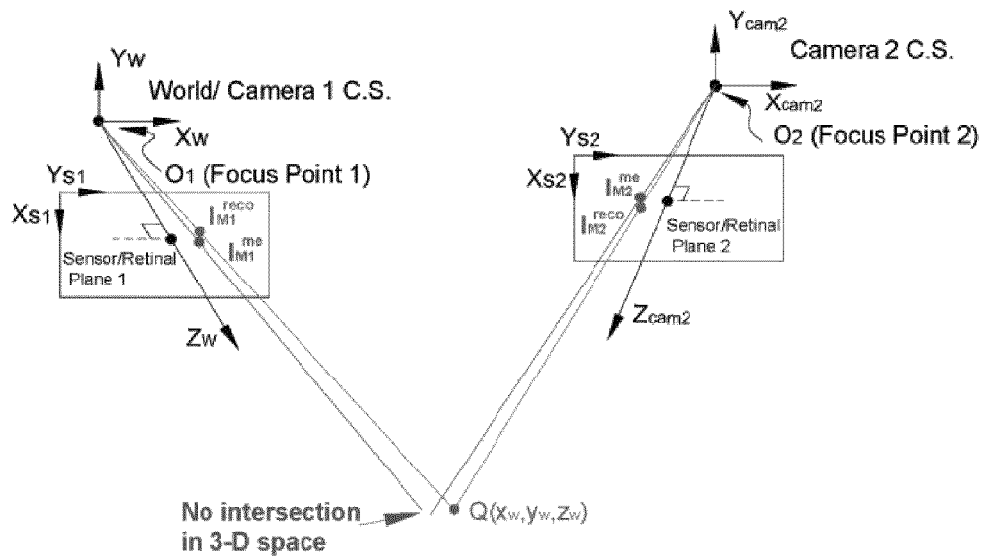
FIG. 7 is a schematic representation of aspects associated with three-dimensional spatial position reconstruction in accordance with the presently disclosed technology.

Referring now to FIG. 7, aspects of three-dimensional spatial position reconstruction are presented. Suppose $I_{M1}^{me}(X_s, Y_s)$ and $I_{M2}^{me}(X_s, Y_s)$ are the measured corresponding points on the stereo vision sensor planes that have been processed to remove distortion. The corresponding three-dimensional spatial point is $Q(x_w, y_w, z_w)$. Two rays projected from $I_{M1}^{me}(X_s, Y_s)$ and $I_{M2}^{me}(X_s, Y_s)$ into three-dimensional space are not necessarily on the same plane, and hence, may not intersect due to errors in the calibration and measurement processes, as shown in FIG. 7. In order to estimate the optimal three-dimensional spatial position $Q(x_w, y_w, z_w)$, $I_M^{reco}(X_s, Y_s)$ and its corresponding model location $I_M^{mo\_reco}(X_s, Y_s)$ are introduced. First $I_M^{reco}(X_s, Y_s)$ is the image point for $Q(x_w, y_w, z_w)$ on the sensor plane. Second, $I_M^{reco}(X_s, Y_s)$ is assumed to be in close proximity to the measured location $I_M^{me}(X_s, Y_s)$. Third, the general least-square error function defined in equation (12) below is minimized to determine the optimal three-dimensional point $Q(x_w, y_w, z_w)$. Specifics for $I_M^{mo\_reco}(X_s, Y_s)$ are now described.

$$\chi_{reco}^2 = \sum_{i=1}^{2} [(x_s^{mo\_reco}{}_i - x_s^{me}{}_i)^2 + (y_s^{mo\_reco}{}_i - y_s^{me}{}_i)^2] \quad (12)$$

For object points in air, three-dimensional spatial position reconstruction without refraction is considered. $I_m^{mo\_reco}(X_s, Y^s)$ is obtained by first assuming that $Q(x_w, y_w, z_w)$ is unknown, and then transforming it from the WCS to the sensor plane by equation (7a). Therefore the reconstruction of Q without refraction is reduced to minimizing $\chi_{reco}^2$.

Figure 8:
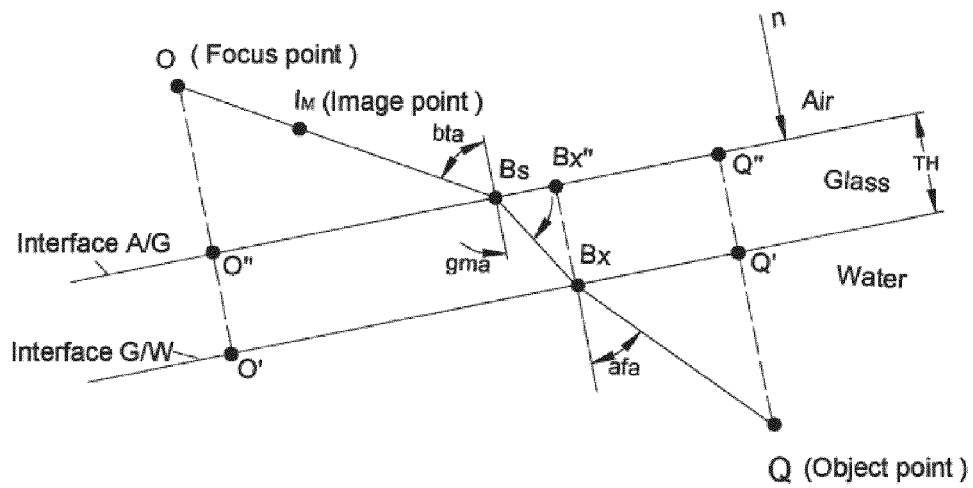
FIG. 8 a graphical representation of a transmitted light path from a grid point (Q) in a first medium (W), through two parallel planar interfaces associated with a second medium (G) to a focus point (O) of a measurement system in a third medium(A) for three-dimensional spatial position reconstruction of submerged object points.

For objects that are submerged in a fluid, three-dimensional spatial position reconstruction with refraction is considered, and $I_m^{mo\_reco}(X_s, Y_s)$ is established by two steps. First, the refraction angle bta is introduced as an extra unknown and equations are set up for $I_M^{mo\_reco}(X_s, Y_s)$ similar to those shown in modeling relationships set forth above. Second, a constraint for bta is set up as the sum of distances from $B_s$ to O", from $B_x$" to $B_s$, and from Q" to $B_x$" as being equal to the distance from Q" to O", as shown in FIG. 8.

It is noted that $I_m^{mo\_reco}(X_s, Y_s)$ is different from $I_m^{mo}(X_s, Y_s)$ above in several ways. First, for $I_M^{mo\_reco}(X_s, Y_s)$, the interface parameters a, b and d are known but for $I_m^{mo}(X_s, Y_s)$, they are not known. Second, there are no grid parameters for $I_M^{mo\_reco}(X_s, Y_s)$, and each point on the object for reconstruction is treated individually. Third, the refraction angle bta for $I_M^{mo\_reco}(X_s, Y_s)$ in FIG. 8 is physically the same as β for $I_M^{mo}(X_s, Y_s)$ in FIG. 5, but bta is unknown and needs to be optimized while β is known and calculated based on $I_M^{me}(X_s, Y_s)$. Fourth, the unknown parameters for $I_M^{mo\_reco}(X_s, Y_s)$ are $Q(x_w, y_w, z_w)$, bta and λ (λ is used to define a constraint for bta), while those for $I_M^{mo}(X_s, Y_s)$ are interface parameters and grid parameters.

The least-square error function is set up as the sum of difference between $I_M^{me}(X_s, Y_s)$ and $I_M^{mo\_reco}(X_s, Y_s)$ plus the constraint for the refraction angle bta as follows:

$$\chi_{reco}^2 = \sum_{i=1}^{2} [(x_s^{mo\_reco}{}_i - x_s^{me}{}_i)^2 + (y_s^{mo\_reco}{}_i - y_s^{me}{}_i)^2 + \quad (13)$$

$$\lambda_i (\|Q''O''\| - \|B_{si}O''\| - \|B''_{xi}B_{si}\| - \|Q''B''_{xi}\|)]$$

The unknown parameters for each camera, and λ for each bta. Reconstruction of $Q(x_w, y_w, z_w)$ with refraction is reduced to minimizing $\chi_{reco}^2$ in equation (13).

EXAMPLES

Example 1

As a first numeric simulation to illustrate aspects of the present invention, parameters from a Nikon SMZU stereomicroscopy system were used in an exemplary measurement system having a schematic similar to that shown in FIG. 4. Camera 2's local coordinate system (camCS) was obtained by initially equaling camCS to WCS, rotating the camCS around WCS's y-axis as angle _y=6.0° (clockwise), then translating camCS to (50.0, 0.0, 0.0) in WCS. The rotation matrix [R] and {T} in Eq. (5) for camera 2 was $$[R] = \begin{bmatrix} 0.9945 & 0.0 & 0.1045 \\ 0.0 & 1.0 & 0.0 \\ -0.1045 & 0.0 & 0.9945 \end{bmatrix} \text{ and } \{T\} = \begin{Bmatrix} -50.0 \\ 0.0 \\ 0.0 \end{Bmatrix}.$$

The projection matrixes for two cameras in Eq. (7b) were $$[M_p]\_cam1 = \begin{bmatrix} 17600.0 & 100.0 & 4200.0 \\ 0.0 & 17600.0 & 420.0 \\ 0.0 & 0.0 & 1.0 \end{bmatrix},$$

$$[M_p]\_cam2 = \begin{bmatrix} 18000.0 & -50.0 & -3200.0 \\ 0.0 & 18000.0 & 250.0 \\ 0.0 & 0.0 & 1.0 \end{bmatrix}.$$

The interface parameters a, b and d were 0.1, 0.2 and −150.0. The thickness of the interface (TH) was 6.0. The refraction indexes for media A, media G and media W were 1.0, 1.82 and 1.33, respectively.

Figure 9A:
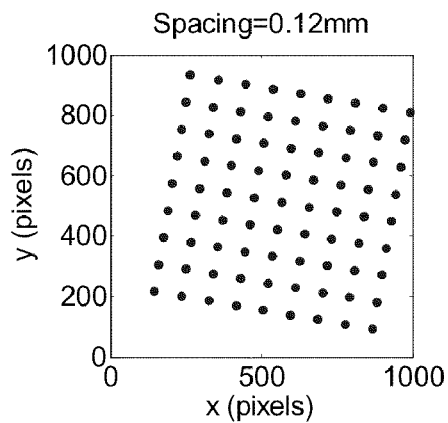
FIGS. 9A and 9B provide respective graphs showing a calibration grid's image on two sensor planes at a $1^{st}$ exemplary view for interface calibration.
Figure 9B:
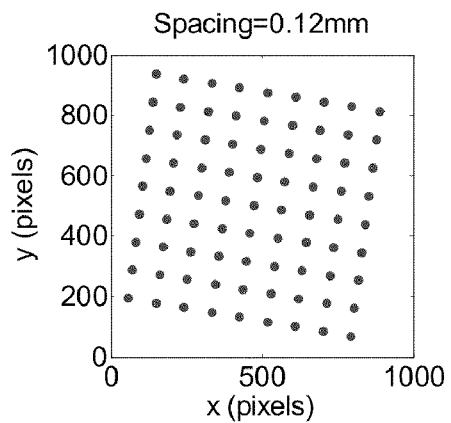

A calibration grid of 9 by 9 points with 1.2 mm spacing in either direction was used to do the calibration. 9 views of images at which the grid was at different locations and orientations were taken as input data to do the calibration. The grid's parameters for these 9 views are in Table 2. FIGS. 9A and 9B show the grid's images on two respective sensor planes at the first view. The grid's image filled almost the whole sensor plane if a camera of 1024 by 1324 pixels was used.

TABLE 2

Grid's parameters of 9 views for calibration.

| | 1st view | 2nd view | 3rd view | 4th view | 5th view | 6th view | 7th view | 8th view | 9th view |
|---|---|---|---|---|---|---|---|---|---|
| $D_x$ (mm) | 22.0 | 20.8 | 19.5 | 28.0 | 29.1 | 30.8 | 33.3 | 34.8 | 35.0 |
| $D_y$ (mm) | −2.0 | −3.2 | −4.5 | 2.0 | 3.1 | 4.8 | 7.2 | 8.8 | 10.0 |
| $D_z$ (mm) | 164.0 | 162.8 | 161.5 | 166.0 | 166.5 | 167.0 | 160.5 | 159.2 | 158.0 |
| $\gamma_x$ (°) | −10.0 | −15.0 | −20.0 | −25.0 | 5.0 | 15.0 | 20.0 | 30.0 | 25.0 |
| $\gamma_y$ (°) | 5.0 | 12.0 | 18.0 | −5.0 | −14.0 | −5.0 | −18.0 | −12.0 | −10.0 |
| $\gamma_z$ (°) | −10.0 | −15.0 | −20.0 | −25.0 | 5.0 | 20.0 | 35.0 | 40.0 | 50.0 |

Numerical simulations of the calibration process have been implemented for both cases where $I_m^{measured}(X_s^{measured}, Y_s^{measured})$ on the sensor planes has error or not. As appreciated by one of ordinary skill in the art, any image processing methods that extract points from sensor planes will inevitably introduce errors. For example, when using digital image correlation to correlate the corresponding points on two sensor planes, Sutton et al. (Advances in two-dimensional and three-dimensional computer vision. Photomechanics, Topics Appl. Phys. 77, 323-372 (2000)) concluded that through a combination of oversampling, interpolation and quantization with at least 8 bits, the original intensity pattern can be reconstructed with reasonable accuracy and the displacement field estimated with accuracy of ±0.02 pixels or better. Errors satisfying the Gaussian distribution with the standard deviation of ±0.02 pixels were added to $I_M^{measured}(X_s^{measured}, Y_s^{measured})$ before the optimization process. Table 3 and Table 4 show the calibration results without or with errors in $I_m^{measured}(X_s^{measured}, Y_s^{measured})$ on the sensor plane.

TABLE 3

Optimization results without errors in $I_M^{measured}$ (Xs,Ys).

| | Initial values | Results | Theor. values | Error*** (%) |
|---|---|---|---|---|
| $D_x$*(mm) | 34.474791613101 | 34.800000001492 | 34.800000000000 | 4.28737E−09 |
| $D_y$(mm) | 8.398708500866 | 8.800000000454 | 8.800000000000 | 5.15909E−09 |
| $D_z$(mm) | 158.433109296598 | 159.200000000519 | 159.200000000000 | 3.26011E−10 |
| $\gamma_x$(°) | 0.775837827553 | 0.523598775587 | 0.523598775598 | 2.10086E−09 |
| $\gamma_y$(°) | −0.856770955973 | −0.209439510154 | −0.209439510239 | 4.05845E−08 |
| $\gamma_z$(°) | 0.392838921727 | 0.698131700795 | 0.698131700798 | 4.29725E−10 |
| A | 0.050000000000 | 0.100000000266 | 0.10*** | 2.66E−07 |
| B | 0.150000000000 | 0.200000000052 | 0.20 | 2.6E−08 |
| D | −152.00000000000 | −150.0000000082 | −150.0 | 5.46667E−09 |
| $\chi^2$** | 83949791.64324 | 4.966 e−13 | 1.925 e−12 | |

*the grid parameters are for 8th view, and grid parameters for other views converted the same way as this one.

**$\chi^2$ has been iterated 70 times until it converges.

***% Error is defined as $\left|\dfrac{\text{Results} - \text{Theoretical values}}{\text{Theoretical values}}\right|$ %.

TABLE 4

Optimization results with errors of ±0.02 pixels in $I_M^{measured}$ (Xs, Ys).

|  | Initial values | Results | Theor. values | Error (%) |
|---|---|---|---|---|
| $D_x$* (mm) | 34.474986514139 | 34.79969437500 | 34.8000000000 | 0.000878233 |
| $D_y$ (mm) | 8.398594947915 | 8.798381013232 | 8.80000000000 | 0.018397577 |
| $D_z$ (mm) | 158.43276601746 | 159.1924562050 | 159.200000000 | 0.004738565 |
| $\gamma_x$ (°) | 0.775816870636 | 0.523599116631 | 0.52359877559 | 6.5134E−05 |
| $\gamma_y$ (°) | −0.856793794893 | −0.209414037859 | −0.20943951023 | 0.012162161 |
| $\gamma_z$ (°) | 0.392837883405 | 0.698132677839 | 0.69813170079 | 0.000139952 |
| A | 0.050000000000 | 0.100081401563 | 0.10 | 0.081401563 |
| B | 0.150000000000 | 0.199989061419 | 0.20 | 0.005469291 |
| D | −152.000000000 | −150.0240084712 | −150.0 | 0.016005647 |
| $\chi^2$** | 83952346.50356 | 1.39935 | 1.41219 | |

*the grid parameters are for $8^{th}$ view, and grid parameters for other views converted the same way as this one.
**$\chi^2$ has been iterated 201 times until it converges.

In order to estimate the performance of the interface calibration process, new images of the calibration grid were taken simultaneously by two cameras, and its parameters are in Table 5.

From a pair of corresponding points $I_M^{measured}(X_s^{measured}, Y_s^{measured})$ on two sensor planes, two rays were projected back into 3-D space. When they hit the interfaces, they refracted according to the resulting values of the interface parameters. Then, two rays were triangulated and its grid point's position in 3-D space was measured.

When there are ±0.02 pixel errors in $I_M^{measured}(X_s^{measured}, Y_s^{measured})$ on the sensor planes, even without any interface, the measured grid spacing contains errors. In order to estimate the measured spacing errors caused by the calibration process but not errors on the sensor plane, $I_M^{measured}(X_s^{measured}, Y_s^{measured})$ for data in Table 6 did not include added errors.

TABLE 6

Normal strains of the measured grid spacing*.

| | $1^{st}$ view | $2^{nd}$ view | $3^{rd}$ view | $4^{th}$ view | $5^{th}$ view | $6^{th}$ view | $7^{th}$ view | $8^{th}$ view | $9^{th}$ view |
|---|---|---|---|---|---|---|---|---|---|
| | Using the result of interface parameters without errors on sensor planes as from table 4. (× 10$^{−6}$) | | | | | | | | |
| Mean | 0.0000 | 0.0000 | 0.0001 | 0.0001 | 0.0001 | 0.0001 | 0.0002 | 0.0002 | 0.0002 |
| S.D. | 0.0000 | 0.0000 | 0.0001 | 0.0001 | 0.0001 | 0.0002 | 0.0001 | 0.0002 | 0.0002 |
| | Using the result of interface parameters with errors on sensor planes as from table 5. (× 10$^{−6}$) | | | | | | | | |
| Mean | 1.3295 | 1.9946 | 5.2404 | 4.8040 | 11.4420 | 14.0398 | 11.9151 | 13.8522 | 12.8515 |
| S.D. | 1.1308 | 0.5726 | 0.8102 | 1.2950 | 10.8026 | 13.3711 | 5.76725 | 6.7964 | 8.8195 |

*Normal strain is defined as $\left| \dfrac{\Delta_{Predicted} - \Delta_{Original}}{\Delta_{Original}} \right|$, where $\Delta_{Predicted}$ is the predicted grid spacing based on resulting interface parameters and $\Delta_{Original}$ is the original grid spacing.

TABLE 5

Grid's parameters of 9 views for error estimations.

| | $1^{st}$ view | $2^{nd}$ view | $3^{rd}$ view | $4^{th}$ view | $5^{th}$ view | $6^{th}$ view | $7^{th}$ view | $8^{th}$ view | $9^{th}$ view |
|---|---|---|---|---|---|---|---|---|---|
| $D_x$ (mm) | 21.5 | 21.0 | 20.0 | 28.4 | 29.4 | 30.4 | 33.2 | 34.4 | 34.5 |
| $D_y$ (mm) | −2.5 | −3.5 | −4.5 | 2.0 | 3.5 | 4.6 | 7.3 | 8.5 | 9.5 |
| $D_z$ (mm) | 163.5 | 163.0 | 162.0 | 166.0 | 166.0 | 167.0 | 161.0 | 160.0 | 157.0 |
| $\gamma_x$ (°) | −11.0 | −13.0 | −18.0 | −22.0 | 8.0 | 12.0 | 20.0 | 25.0 | 30.0 |
| $\gamma_y$ (°) | 4.5 | 10.0 | 15.0 | 20.0 | −20.0 | −27.0 | −3.0 | −6.0 | −13.0 |
| $\gamma_z$ (°) | −12.0 | −17.0 | −22.0 | −28.0 | 6.0 | 25.0 | 30.0 | 45.0 | 52.0 |

Figure 10A:
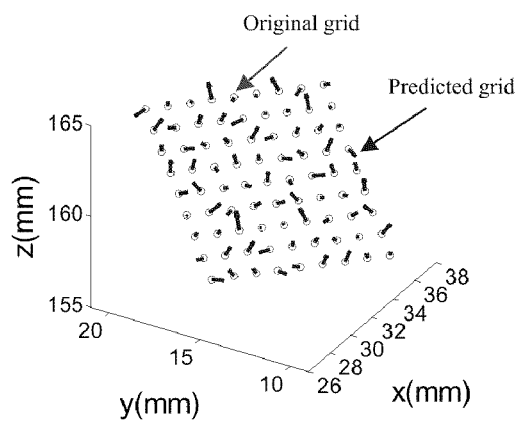
FIGS. 10A and 10B provide respective graphs illustrating a calibration grid at $9^{th}$ exemplary view in 3-D space for error estimation, with FIG. 10A using the results of interface parameters without errors on sensor planes (as in Table 4), and FIG. 10B using the results of interface parameters with errors on sensor planes (as in Table 5)
Figure 10B:
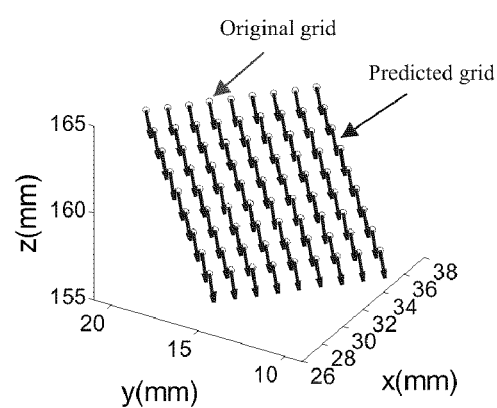

FIGS. 10A and 10B show the 3-D space positions of the original grid and the measured grid at $9^{th}$ view. For all the other 8 views, the 3-D space positions of the original grid and the measured grid follow the same trend as that of the $9^{th}$ view. In FIG. 10A, the results of interface parameters without errors on sensor planes (as in Table 4) are used and the amplitude of the vector pointing from the original grid to the predicted grid has been amplified $1.0 \times 10^8$ times for demonstration. In FIG. 10B, the results of interface parameters with errors on sensor planes (as in Table 5) are used, and the amplitude of the vector has been amplified 200 times.

From Table 4 and Table 5, even with ±0.02 pixel errors in $I_M^{measured}(X_s^{measured}, Y_s^{measured})$ on the sensor planes, the proposed calibration process converged well. Not only did the error function $\chi^2$ converge to its theoretical values, but also the interface parameters and the grid's parameters. The errors between the results and the theoretical values of optimized parameters for the case that there were no errors on the sensor planes were no more than 2.66E-07% and for the case with errors on the sensor planes were no more than 0.82%.

From Table 6 and FIG. 5, errors of the measured normal strain of the grid spacing and 3-D space positions using the resulting interfaces parameters from both cases were negligible. The shear strains of the grid spacing were also negligible as not shown.

Example 2

As a second example, a stereo system set-up for numerical simulation was established as shown in FIG. 4. The WCS is defined at camera 1's local coordinate system. Camera 2's local coordinate system (camCS2) is obtained by initially equaling camCS2 to the WCS, rotating the camCS2 around the WCS y-axis 30.0° (clockwise), then translating camCS2 to (550.0, 0.0, 0.0) in the WCS. The rotation matrix [R] and {T} in equation (5) for camera 2 are written as $$[R] = \begin{bmatrix} 0.9945 & 0.0 & 0.1045 \\ 0.0 & 1.0 & 0.0 \\ -0.1045 & 0.0 & 0.9945 \end{bmatrix} \text{ and } \{T\} = \begin{Bmatrix} -50.0 \\ 0.0 \\ 0.0 \end{Bmatrix}$$

The projection matrices for two cameras in equation (7b) are $$[M_p]\_cam1 = \begin{bmatrix} 12000.0 & 5.0 & 730.0 \\ 0.0 & 12000.0 & 530.0 \\ 0.0 & 0.0 & 1.0 \end{bmatrix},$$

$$[M_p]\_cam2 = \begin{bmatrix} 11850.0 & 6.0 & 740.0 \\ 0.0 & 11850.0 & 520.0 \\ 0.0 & 0.0 & 1.0 \end{bmatrix}.$$

where $[M_p]$ is selected based on a typical stereo camera set-up. For simplicity, the lens distortion factor κ is set to zero. The interface parameters a, b and d are 0.1, 0.2, and −800.0, respectively. The thickness of the glass TH is 3.0 mm. The refractive indices for air, glass, and water are 1.00, 1.77 and 1.33, respectively.

A planar calibration grid of nine by nine points with 3.0 mm spacing in either direction is used for calibration. A total of 55 views (110 images) at which the grid is in air and at varied locations and orientations are used to calibration the stereo system. A total of nine views (18 images), where the grid is immersed in fluid at different locations and orientations, are used to determine the interface parameters. The grid's parameters for these nine views are shown in Table 7.

TABLE 7

Grid parameters of nine views for interface calibration.

| | 1st view | 2nd view | 3rd view | 4th view | 5th view | 6th view | 7th view | 8th view | 9th view |
|---|---|---|---|---|---|---|---|---|---|
| $D_x$ (mm) | 256.0 | 260.0 | 275.0 | 240.0 | 220.0 | 215.0 | 245.0 | 235.0 | 280.0 |
| $D_y$ (mm) | −30.0 | −40.0 | 10.0 | −20.0 | 20.0 | 50.0 | 12.0 | 5.0 | −15.0 |
| $D_z$ (mm) | 943.0 | 952.0 | 960.0 | 950.0 | 980.0 | 970.0 | 955.0 | 985.0 | 990.0 |
| $\gamma_x$ (°) | −6.0 | −15.0 | −20.0 | −25.0 | 30.0 | 21.0 | 16.0 | 9.0 | 5.0 |
| $\gamma_y$ (°) | −35.0 | −22.0 | −12.0 | −5.0 | 5.0 | 10.0 | 18.0 | 23.0 | 36.0 |
| $\gamma_z$ (°) | −50.0 | −40.0 | −30.0 | −20.0 | −5.0 | 10.0 | 25.0 | 40.0 | 50.0 |

Numerical simulations of the calibration process have been implemented where (a) $I_M^{me}(X_s, Y_s)$ does not have additive errors and (b) errors satisfying Gaussian distribution with a standard deviation of ±0.02 and ±0.05 pixels are added to $I_M^{me}(X_s, Y_s)$ before the optimization process.

When using digital image correlation (DIC) to correlate the corresponding points on two sensor planes, errors may inevitably be introduced. Tables 8, 9 and 10 show the interface calibration results with and without additive errors in $I_M^{me}(X_s, Y_s)$. As noted, although these tables only show the calibration data for one view, grid parameters for all nine views in Table 2 are optimized at the same time and the difference between optimization results and theoretical values has the same trend as the view listed in these tables.

TABLE 8

Optimization Results without errors in $I_M^{me}(X_s, Y_s)$.

| | Initial values | Results | Theoretical values | Error‡ (%) |
|---|---|---|---|---|
| $D_x$*(mm) | 236.466 | 234.999 | 235.000 | 0.004 × 10⁻⁷ |
| $D_y$(mm) | 3.434 | 4.999 | 5.000 | 0.066 × 10⁻⁷ |
| $D_z$(mm) | 976.332 | 984.999 | 985.000 | 0.044 × 10⁻⁷ |
| $\gamma_x$(°) | 9.379 | 8.999 | 9.000 | 0.005 × 10⁻⁷ |
| $\gamma_y$(°) | 23.758 | 22.999 | 23.000 | 0.015 × 10⁻⁷ |
| $\gamma_z$(°) | 40.208 | 39.999 | 40.00 | 0.001 × 10⁻⁷ |
| a | 0.044 | 9.999 × 10⁻³ | 0.01 | 1.000 × 10⁻⁷ |
| b | −0.024 | 10.000 × 10⁻³ | 0.01 | 0.200 × 10⁻⁷ |
| d | −832.650 | −800.000 | −800.0 | 0.130 × 10⁻⁷ |
| $\chi^{2\dagger}$ | 5193.258 | 2.510 × 10⁻¹³ | 7.0 × 10⁻¹⁶ | |

*the grid parameters are for 8th view in Table 2
†a total of 33 iterations required for convergence when $|\chi_{cur}^2 - \chi_{prev}^2|/\chi_{prev}^2 < 1 \times 10^{-5}$
‡error is defined as $\left| \frac{\text{results} - \text{theoretical values}}{\text{theoretical values}} \right| \%$

TABLE 9

Optimization Results with errors of ±0.05 pixels in $I_M^{me}(X_s, Y_s)$.

| | Initial values | Results | Theoretical values | Error (%) |
|---|---|---|---|---|
| $D_x$* (mm) | 236.206 | 234.800 | 235.000 | 0.096 |
| $D_y$ (mm) | 3.471 | 5.012 | 5.000 | 0.233 |
| $D_z$ (mm) | 975.470 | 984.124 | 985.000 | 0.089 |
| $\gamma_x$ (°) | 8.361 | 9.007 | 9.000 | 0.073 |
| $\gamma_y$ (°) | 23.926 | 22.976 | 23.000 | 0.106 |
| $\gamma_z$ (°) | 40.207 | 39.999 | 40.00 | 0.003 |
| a | 0.044 | 9.430 × 10⁻³ | 0.01 | 5.704 |
| b | −0.025 | 9.464 × 10⁻³ | 0.01 | 5.360 |
| d | −831.798 | −799.366 | −800.0 | 0.079 |
| $\chi^{2\dagger}$ | 6224.299 | 2.268 | 144.003 | |

*the grid parameters are for 8th view Table 2
†a total of 30 iterations required for convergence

TABLE 10

Grid parameters of new views for error estimation (rotating around x and y axes)

Rotating the calibration grid around x-axis of WCS

View #

| | 1 | 2 | 3 | 4 | 5 | 6 | 7 | 8 | 9 |
|---|---|---|---|---|---|---|---|---|---|
| $\gamma_x$ (°) | −65.0 | −60.0 | −50.0 | −45.0 | −30.0 | −20.0 | −10.0 | −5.0 | 0.0 |
| $\gamma_y$ (°) | 0.0 | | | | | | | | |

View #

| | 10 | 11 | 12 | 13 | 14 | 15 | 16 | 17 |
|---|---|---|---|---|---|---|---|---|
| $\gamma_x$ (°) | 5.0 | 10.0 | 20.0 | 30.0 | 45.0 | 50.0 | 60.0 | 65.0 |
| $\gamma_y$ (°) | 0.0 | | | | | | | |

Rotating the calibration grid around y-axis of WCS

View #

| | 18 | 19 | 20 | 21 | 22 | 23 | 24 | 25 | 26 |
|---|---|---|---|---|---|---|---|---|---|
| $\gamma_x$ (°) | 0.0 | | | | | | | | |
| $\gamma_y$ (°) | −65.0 | −60.0 | −50.0 | −45.0 | −30.0 | −20.0 | −10.0 | −5.0 | 0.0 |

View #

| | 27 | 28 | 29 | 30 | 31 | 32 | 33 | 34 |
|---|---|---|---|---|---|---|---|---|
| $\gamma_x$ (°) | 0.0 | | | | | | | |
| $\gamma_y$ (°) | 5.0 | 10.0 | 20.0 | 30.0 | 45.0 | 50.0 | 60.0 | 65.0 |
| $\gamma_z$ (°) | 0.0 | | | | | | | |

TABLE 10-continued

Grid parameters of new views for error estimation (rotating around x and y axes)

| Dx (mm) | 275.0 |
|---|---|
| Dy (mm) | 0.0 |
| Dz (mm) | 960.0 |

Figure 11:
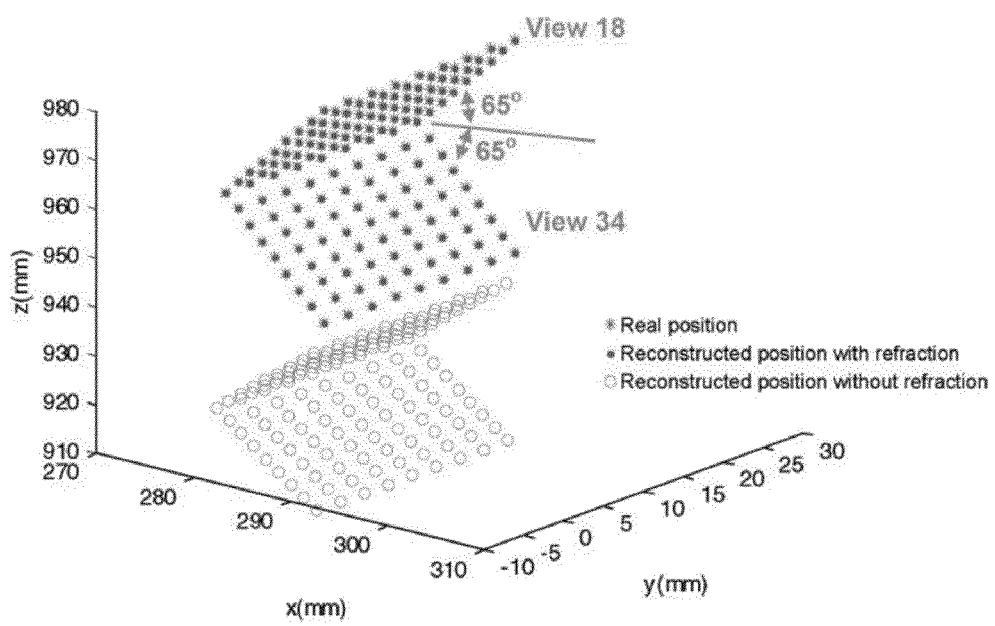
FIG. 11 shows the real position and reconstructed position of a measured object based on resulting calibration parameters from simulation, with data being shown without errors for views 18 and 34 in Table 10.
Figure 12:
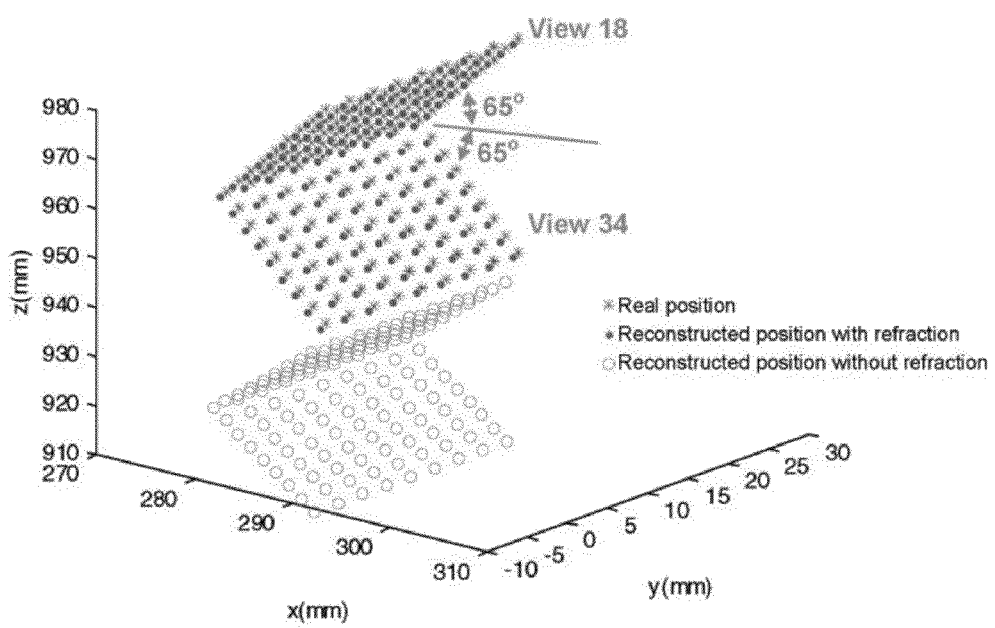
FIG. 12 shows the real position and reconstructed position of a measured object based on calibration parameters from simulation, with data shown with image plane errors of ±0.05 pixels for views 18 and 34 in Table 10.

In order to estimate the performance of the calibration process, images of a rotated calibration grid located within the fluid were taken simultaneously by two cameras; grid parameters are listed in Table 10. From a pair of corresponding $I_M^{me}(X_s, Y_s)$ on two sensor planes, the three-dimensional spatial position on the grid is reconstructed according to equation (13). FIGS. 11 and 12 show both (a) the true spatial positions of the calibration grid and (b) the reconstructed positions, with and without considering refraction. For other views in Table 10, grid positions have a similar trend as shown in FIGS. 11 and 12.

Deformation errors associated with the calibration process are estimated by measuring the pseudo normal and shear strains for the reconstructed grid spacing. FIGS. 13A, 13B, 14A and 14B show the measured pseudo normal and shear strains for the reconstructed grid with and without considering refraction, respectively. Since rotation of the grid around the x-axis primarily affects grid coordinates in the y-direction, only normal strain in the y-direction is plotted. The same is true for the case when rotating the grid around the x-axis; only normal strain in the x-direction is plotted. The shear strain has the same trend for both cases, so only one case is presented.

Table 11 shows the influence of additive Gaussian random noise to the measured residual normal and shear strains of the reconstructed grid when considering refraction.

TABLE 11

Pseudo normal and shear strains with varied Gaussian random noise

| | Pseudo normal strains ($\times 10^{-6}$) when rotating the calibration grid around x-axis | | | | | | Pseudo normal strains ($\times 10^{-6}$) when rotating the calibration grid around y-axis | | | | | | Pseudo shear strains ($\times 10^{-6}$) when rotating the calibration grid around y-axis | | | | | |
|---|---|---|---|---|---|---|---|---|---|---|---|---|---|---|---|---|---|---|
| | No errors | | ±0.02 errors | | ±0.05 errors | | No errors | | ±0.02 errors | | ±0.05 errors | | No errors | | ±0.02 errors | | ±0.05 errors | |
| Angle (°) | Mean | Std | Mean | Std | Mean | Std | Mean | Std | Mean | Std | Mean | Std | Mean | Std | Mean | Std | Mean | Std |
| −65 | 0 | 0 | −88 | 2025 | 277 | 4383 | 0 | 0 | −114 | 1977 | 30 | 4347 | 0 | 0 | 0 | 1670 | 181 | 4962 |
| −60 | 0 | 0 | −76 | 1677 | −14 | 4230 | 0 | 0 | −122 | 1817 | 89 | 3596 | 0 | 0 | −44 | 1869 | 7 | 4242 |
| −50 | 0 | 0 | −72 | 1689 | 124 | 3908 | 0 | 0 | −123 | 1524 | 128 | 4019 | 0 | 0 | −39 | 1413 | 0 | 4344 |
| −45 | 0 | 0 | −36 | 1754 | 125 | 2913 | 0 | 0 | −120 | 1369 | 78 | 4173 | 0 | 0 | 99 | 1321 | −67 | 4632 |
| −30 | 0 | 0 | 34 | 890 | 74 | 2741 | 0 | 0 | −75 | 864 | −369 | 2338 | 0 | 0 | 79 | 995 | −49 | 2936 |
| −20 | 0 | 0 | 43 | 787 | 30 | 2055 | 0 | 0 | −48 | 664 | −103 | 1829 | 0 | 0 | 34 | 832 | −5 | 1878 |
| −10 | 0 | 0 | 66 | 524 | 45 | 1245 | 0 | 0 | 32 | 454 | −12 | 1267 | 0 | 0 | 29 | 626 | −94 | 1652 |
| −5 | 0 | 0 | 20 | 387 | 42 | 1187 | 0 | 0 | 65 | 470 | 5 | 1082 | 0 | 0 | 30 | 678 | −6 | 1519 |
| 0 | 0 | 0 | 33 | 473 | 70 | 1004 | 0 | 0 | 104 | 577 | 54 | 1186 | 0 | 0 | −16 | 708 | −32 | 1525 |
| 5 | 0 | 0 | 56 | 478 | 57 | 1197 | 0 | 0 | 127 | 455 | 10 | 1071 | 0 | 0 | −11 | 611 | −57 | 1232 |
| 10 | 0 | 0 | 49 | 578 | −48 | 1279 | 0 | 0 | 151 | 527 | 85 | 1227 | 0 | 0 | −23 | 644 | −43 | 1583 |
| 20 | 0 | 0 | 24 | 845 | 112 | 2027 | 0 | 0 | 191 | 926 | 141 | 1768 | 0 | 0 | −46 | 1024 | 200 | 2418 |
| 30 | 0 | 0 | 44 | 1119 | 246 | 3101 | 0 | 0 | 178 | 1298 | 68 | 3193 | 0 | 0 | 107 | 1344 | −151 | 3478 |
| 45 | 0 | 0 | −110 | 1568 | 163 | 3396 | 0 | 0 | 226 | 1827 | 94 | 3489 | 0 | 0 | −136 | 1607 | −36 | 3800 |
| 50 | 0 | 0 | −77 | 1823 | 244 | 3975 | 0 | 0 | 171 | 1504 | 63 | 4122 | 0 | 0 | 34 | 1633 | −147 | 4156 |
| 60 | 0 | 0 | −56 | 1565 | −154 | 3617 | 0 | 0 | 64 | 1528 | 0 | 4801 | 0 | 0 | −171 | 1636 | −131 | 4683 |
| 65 | 0 | 0 | −25 | 1715 | 176 | 4867 | 0 | 0 | 32 | 1803 | 208 | 4707 | 0 | 0 | −159 | 1839 | −45 | 4326 |

As shown in Tables 7, 8 and 9, the proposed interface calibration process converges, with or without additive Gaussian sensor plane errors. Without Gaussian errors added to the image locations, the interface and grid parameters converge to their exact values; errors between the results and the theoretical values of optimized parameters are less than $10^{-7}$ per cent. With sensor-plane positional errors of ±0.05 pixels and nine calibration views of the submerged grid, deviations in the calibration parameters are less than 2.2 per cent.

As shown in FIGS. 11 and 12, the reconstructed three-dimensional spatial positions of the grid points using the resulting calibration parameters for each case are close to the true positions, with slight shifts visible in the figures. The small offset form the real position to the reconstructed position is due to a combination of sensor plane errors and variations in the system calibration parameters.

FIGS. 13A-14B demonstrate the potential of the proposed calibration method to correct distortions induced by refraction. When the rotation angle is more than ±10°, the measured residual pseudo normal strain is significantly smaller than that without refraction correction. The measured residual pseudo shear strain is also smaller than that without refraction correction. From Table 11, the measured residual normal and shear strains are negligible when no sensor plane errors exist. When Gaussian errors up to ±0.05 pixels exist and nine submerged views of the grid are used for calibration, the standard deviation for the residual pseudo normal and shear strain is ±5000×$10^{-6}$, indicating that the proposed calibration method is robust, even for large sensor plane errors and large object motions. As noted, there is a bias of within ±250×$10^{-6}$ in the mean of the normal and shear strains with errors on the sensor plane.

Figure 13A:
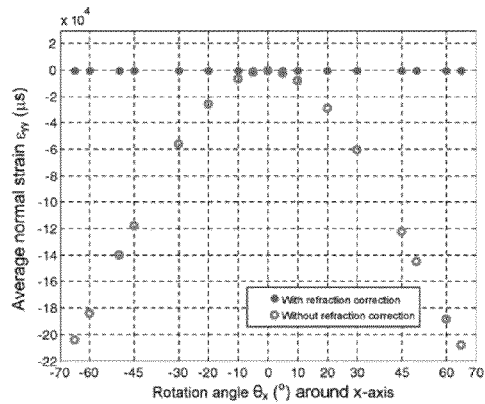
FIGS. 13A and 13B show pseudo normal strains of reconstructed grid spacing with and without considering refraction.
Figure 13B:
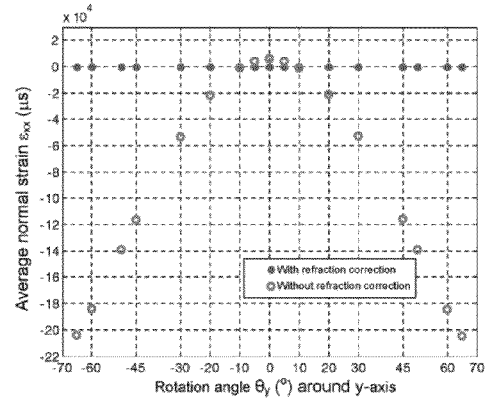
Figure 14A:
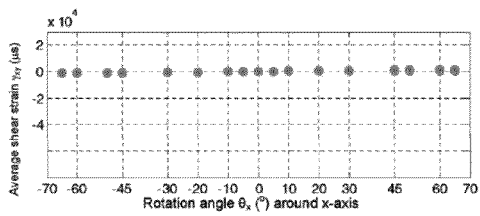
FIGS. 14A and 14B show pseudo shear strains in reconstructed grid spacing with and without considering the effect of refraction for (a) rotation about the x-axis, $\theta_x$, and (b) rotation about the y-axis, $\theta_y$.
Figure 14B:
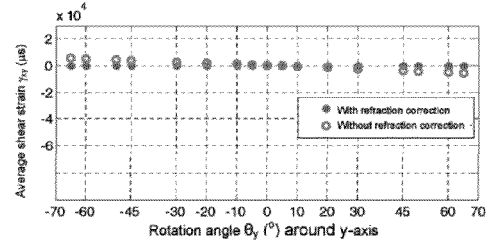

As shown in FIGS. 13A and 13B, the effect of refraction on the accuracy of object deformation measurements is significant, especially when the object rotates relative to the interface(s). For example, if the object routes toward (away) from the interface by 10°, the strain errors in an uncorrected measurement system may exceed 4000 µs. The disclosed interface calibration method for measurements on submerged objects is shown to be effective, reducing the strain errors to zero or near zero.

The disclosed calibration method obtains an optimal solution for interface parameters that accurately determines the orientation and position of the interface. By locating appropriate calibration target features in the sensor plane, refraction angles are estimated in a simple way that circumvents the need to solve complex, non-linear equations.

Numerical simulations for the optimization process have shown rapid convergence, even when using sensor plane measurements that contain Gaussian noise up to ±0.05 pixels, demonstrating the robustness of the disclosed calibration method.

Based on the reconstructed three-dimensional spatial position of the calibration grid, the measured residual pseudo normal and shear strains of the reconstructed grid spacing are relatively small, being less than 5000×$10^{-6}$ (at the worse case when the sensor measurement errors are ±0.05 pixels) when viewing a grid that has rotated by 65°, a 40-fold reduction relative to the errors that would occur without interface calibration, demonstrating the overall accuracy of the approach.

The disclosed stereovision calibration method has the potential to solve interface problems with multiple media and non-planar interfaces, as long as the interfaces can be modeled using a parametric representation that is invariant during the calibration and measurement processes. Finally, it is worth noting that the proposed approach can be "extended" by introducing the refractive index of fluid as one of the unknown parameters in the optimization process. In this case, the modified optimization procedure determines an equivalent refractive index that represents the overall effect of a heterogeneous refractive medium surrounding the submerged object.

It will be apparent to those skilled in the art of sensor design and manufacture that many modifications and substitutions can be made to the foregoing exemplary embodiments without departing from the spirit and scope of the present invention, defined by the appended claims.

What is claimed is:

1. A method for calibrating a measurement system by determining interface parameters representative of an interface provided between the measurement system and a physical object to be measured, comprising:
    obtaining a first plurality of images of a calibration object, said first plurality of images obtained by the measurement system comprising two or more image capture devices that are provided in the same medium as the calibration object;
    obtaining a second plurality of images of the calibration object, the second plurality of images obtained while the measurement system is in a different medium than the calibration object, said different media being separated from one another by the interface, and said second plurality of images obtained by the two of more image capture devices while the calibration object is provided at a respective plurality of different locations and orientations relative to said interface;
    extracting and electronically storing data corresponding to measured positions of selected image points from the first and second pluralities of images of the calibration object;
    electronically calculating initial values of interface parameters from data corresponding to measured positions of selected image points from the first plurality of images;
    providing electronic definitions of modeled positions of image points based on said initial values of the interface parameters; and
    establishing and electronically storing an error function defined by the difference between modeled positions and measured positions of selected image points from the second plurality of images.

2. The method of claim 1, wherein said error function is further defined by unknown values of the interface parameters, and wherein the method further comprises a step of using an optimization process to determine optimized estimation of the unknown interface parameters.

3. The method of claim 2, wherein said step of using an optimization process comprises minimizing the error function defined by the difference between modeled positions and measured positions of selected image points.

4. The method of claim 2, wherein the unknown interface parameters are optimized
    simultaneously or individually in an iterative process.

5. The method of claim 1, wherein said plurality of different locations and orientations relative to said interface are sufficient to determine one or more of in-plane translation, in-plane rotation and out-of-place tilting of the calibration object.

6. The method of claim 1, further comprising a step of processing said data corresponding to measured positions of selected image points to remove lens distortion.

7. The method of claim 1, wherein the interface comprises multiple layers, each layer being modeled using a parametric representation of interface parameters.

8. The method of claim 1, further comprising a step of performing initial calibration of the two or more image capture devices in the measurement system by establishing a plurality of intrinsic and extrinsic parameters associated with the plurality of image capture devices.

9. The method of claim 8, wherein the plurality of instrinsic and extrinsic parameters associated with the two or more image capture devices comprises one or more of the lens focal length, scale factors, skew and lens distortion factor associated with each image capture device, and a rotation vector and translation vector defining relative position of each image capture device relative to at least one other image capture device.

10. A measurement system, comprising:
two or more image capture devices configured to obtain a first plurality of images of a calibration object when provided in the same medium as the measurement system and a second plurality of images of the calibration object when provided in a different medium as the measurement system and separated by an interface;
a first memory for storing data corresponding to measured positions of selected image points from the first and second pluralities of images of the calibration object;
a second memory for storing software in the form of computer-executable instructions; and
a processor coupled to said first and second memories and configured to selectively implement the computer-executable instructions stored in the second memory to process the data stored in the first memory, wherein said processor implements the computer-executable instructions stored in said second memory in order to implement the functions of: calculating initial values of interface parameters from data corresponding to measured positions of selected image points from the first plurality of images; providing definitions of modeled positions of image points based on said initial values of the interface parameters; and establishing an error function defined by the difference between modeled positions and measured positions of selected image points from the second plurality of images.

11. The measurement system of claim 10, wherein said two or more image capture devices comprise digital cameras.

12. The measurement system of claim 10, wherein said error function is further defined by unknown values of the interface parameters, and wherein said processor is further configured to implement a function of using an optimization process to determine optimized estimation of the unknown interface parameters.

13. The measurement system of claim 10, wherein using an optimization process comprises minimizing the error function defined by the difference between modeled positions and measured positions of selected image points.

14. The measurement system of claim 10, wherein said processor is further configured to process the data corresponding to measured positions of selected image points to remove lens distortion.

15. The measurement system of claim 10, wherein said processor is further configured to perform initial calibration of the two or more image capture devices by determining a plurality of intrinsic and extrinsic parameters associated with the plurality of image capture devices.

16. The measurement system of claim 15, wherein the plurality of instrinsic and extrinsic parameters associated with the two or more image capture devices comprises one or more of the lens focal length, scale factors, skew and lens distortion factor associated with each image capture device, and a rotation vector and translation vector defining relative position of each image capture device relative to at least one other image capture device.

17. A method of processing an image taken of a physical object provided in a different physical medium than a measurement system to correct for refraction at an interface between the different media, said method comprising:
obtaining at least one image of a physical object, said at least one image obtained by the measurement system comprising two or more image capture devices that are provided in a different physical medium than the measurement system and separated by an interface;
electronically storing measured image data points associated with the at least one image in an electronic database;
electronically processing the measured image data points to determine actual image data points by applying a determined interface filter function to the measured image data points; and
providing the actual image data points as visual output to a user.

18. The method of claim 17, wherein the determined interface filter function transforms measured image data points to actual measured data points based on a model defined by calibrated interface parameters that define the orientation and position of the interface.

19. The method of claim 17, wherein electronically processing the measured image data points comprises applying a triangulation method to determine the actual image data points.

20. The method of claim 17, wherein the determined interface filter function corrects for distortion effects originating from the two or more image capture devices as well as refraction effects originating from the interface.

* * * * *